US010412705B2

(12) United States Patent
Chang et al.

(10) Patent No.: US 10,412,705 B2
(45) Date of Patent: Sep. 10, 2019

(54) DATA TRANSMISSION PROCESSING METHOD, USER EQUIPMENT, AND BASE STATION

(71) Applicant: HUAWEI TECHNOLOGIES CO., LTD., Shenzhen, Guangdong (CN)

(72) Inventors: Junren Chang, Beijing (CN); Shulan Feng, Beijing (CN); Jinhuan Xia, Beijing (CN); Xiangdong Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/023,353

(22) Filed: Jun. 29, 2018

(65) Prior Publication Data
US 2018/0317202 A1 Nov. 1, 2018

Related U.S. Application Data

(63) Continuation of application No. PCT/CN2015/100312, filed on Dec. 31, 2015.

(51) Int. Cl.
*H04W 68/02* (2009.01)
*H04W 76/10* (2018.01)
(Continued)

(52) U.S. Cl.
CPC .......... *H04W 68/02* (2013.01); *H04L 9/0847* (2013.01); *H04W 48/12* (2013.01);
(Continued)

(58) Field of Classification Search
CPC .................................................. H04W 68/02
(Continued)

(56) References Cited

U.S. PATENT DOCUMENTS

2011/0151828 A1 6/2011 Gou et al.
2012/0281566 A1 11/2012 Pelletier et al.
(Continued)

FOREIGN PATENT DOCUMENTS

CN 101651850 A 2/2010
CN 102655666 A 9/2012
(Continued)

OTHER PUBLICATIONS

Partial Supplementary European Search Report, dated Dec. 5, 2018, in European Application No. 15912015.3 (11 pp.).
(Continued)

Primary Examiner — Joel Ajayi
(74) Attorney, Agent, or Firm — Staas & Halsey LLP

(57) ABSTRACT

The present disclosure provides a data transmission processing method including: receiving first indication information and saving context information of user equipment according to the first indication information, where the context information includes identification information of the user equipment; and decoding a PDCCH based on the identification information of the user equipment, to obtain second indication information, where the second indication information is used to determine that the user equipment is a paged object or that there is a service of the user equipment. The indication information meant for the paged object is carried in the PDCCH, so that the user equipment can determine, depending on whether the indication information can be successfully obtained, whether the user equipment is the paged object or has a service, and perform subsequent processing, for example, connecting to a network, when determining that the user equipment is the paged object or has a service.

18 Claims, 13 Drawing Sheets

(51) Int. Cl.
*H04L 9/08* (2006.01)
*H04W 48/12* (2009.01)
*H04W 52/02* (2009.01)
*H04W 68/00* (2009.01)
*H04W 76/19* (2018.01)
*H04W 76/20* (2018.01)

(52) U.S. Cl.
CPC ..... *H04W 52/0229* (2013.01); *H04W 68/005* (2013.01); *H04W 76/10* (2018.02); *H04W 76/19* (2018.02); *H04W 76/20* (2018.02)

(58) Field of Classification Search
USPC .......................................................... 455/458
See application file for complete search history.

(56) References Cited

U.S. PATENT DOCUMENTS

| | | | |
|---|---|---|---|
| 2013/0336301 | A1 | 12/2013 | Deng et al. |
| 2014/0126448 | A1 | 5/2014 | Punz et al. |

FOREIGN PATENT DOCUMENTS

| | | |
|---|---|---|
| CN | 103037470 A | 4/2013 |
| CN | 104247553 A | 12/2014 |

OTHER PUBLICATIONS

3GPP TS 36.304 V12.7.0, "3rd Generation Partnership Project;Technical Specification Group Radio Access Network; Evolved Universal Terrestrial Radio Access (E-UTRA); User Equipment (UE) procedures in idle mode(Release 12)," Dec. 2015, 38 pages.
3GPP TS 36.212 V12.7.0, "3rd Generation Partnership Project;Technical Specification Group Radio Access Network; Evolved Universal Terrestrial Radio Access (E-UTRA); Multiplexing and channel coding(Release 12)," Dec. 2015, 94 pages.
International Search Report dated Sep. 22, 2016, in corresponding International Patent Application No. PCT/CN2015/100312, 7 pgs.
Written Opinion of the International Search Authority dated Sep. 22, 2016, in corresponding International Patent Application No. PCT/CN2015/100312, 4 pgs.
International Search Report dated Sep. 22, 2016 in corresponding International Patent Application No. PCT/CN2015/100312.

DATA TRANSMISSION PROCESSING METHOD, USER EQUIPMENT, AND BASE STATION

CROSS-REFERENCE TO RELATED APPLICATIONS

This disclosure is a continuation of International Application No. PCT/CN2015/100312, filed on Dec. 31, 2015, the disclosure of which is hereby incorporated by reference in its entirety.

TECHNICAL FIELD

Embodiments of the present disclosure relate to communications technologies, and in particular, to a data transmission processing method, user equipment, and a base station.

BACKGROUND

Currently, 3GPP has set up a new project called Narrowband Internet of Things (NB-IoT). An objective of this project is to further extend a current Long Term Evolution (LTE) system, so as to support massive low-throughput Internet of Things devices or massive Internet of Things devices insensitive to a delay requirement. Ultra-low complexity and ultra-low power consumption are two key requirements for such Internet of Things devices.

Terminal devices in conventional LTE systems and Internet of Things devices in NB-IoT are collectively referred to as user equipment (UE). The UE is usually in an idle mode when no service requires transmission. When there is a service requiring data transmission, the UE changes into a connected mode from the idle mode.

Each time when the UE connects to a network because there is data that may need to be transmitted/received, the UE may need to perform massive procedures of message exchange with network-side devices, so as to receive downlink data or transmit uplink data. The network-side devices mainly include a base station such as an evolved NodeB (eNB), and core network devices such as a mobility management entity (MME) and a serving gateway (SGW). A main objective of the massive message exchange is still to establish a connection between the UE and the eNB and establish a valid access stratum context. Therefore, to reduce the massive message exchange performed each time when the UE connects to a network, currently, the 3GPP organization agrees to save access stratum context information (referred to as context information below), and in particular, to save some UE-specific access stratum parameters, on a UE side and an eNB side, so as to reduce radio resource control (RRC) signaling overheads. This helps quickly connect to the network based on the context information saved in the UE and the eNB, to resume data transmission.

However, currently when the context information of the UE is saved in the UE and the eNB, and in particular, when the UE has downlink data that may need to be received, the UE usually triggers, based on a received paging message, a data transmission resumption processing process. Therefore, how UE receives a paging message to further reduce UE power consumption is a problem to be resolved.

Currently, UE usually receives a paging message in the following manner: A paging frame (PF) and a paging occasion (PO) that are for receiving a paging message first may need to be calculated. Specifically, one paging occasion may be one subframe. One paging frame may include a plurality of paging subframes. A PF and a PO are calculated based on the following formulas.

A PF is derived by using the following formula. A system frame number (SFN) that makes the following formula true is obtained:

$$\text{SFN mod } T = (T \text{ div } N) * (UE\_ID \text{ mod } N).$$

For a PO, i_s is first derived from the following formula, and then a corresponding PO value is obtained based on the obtained i_s and a radio access technology of the UE by searching the following table:

i_s=floor(UE_ID/N) mod Ns, where
T is a DRX interval of the UE;
nB is selected from 4T, 2T, T, T/2, T/4, T/8, T/16, and T/32;
N=min(T,nB);
$N_s$=max(1,nB/T); and
UE_ID=IMSI mod 1024.

Generally, radio access technologies for UE include frequency division duplex (FDD) and time division duplex (TDD).

| | FDD: | | | |
|---|---|---|---|---|
| Ns | PO when i_s = 0 | PO when i_s = 1 | PO when i_s = 2 | PO when i_s = 3 |
| 1 | 9 | N/A | N/A | N/A |
| 2 | 4 | 9 | N/A | N/A |
| 4 | 0 | 4 | 5 | 9 |

| | TDD (all UL/DL configurations): | | | |
|---|---|---|---|---|
| Ns | PO when i_s = 0 | PO when i_s = 1 | PO when i_s = 2 | PO when i_s = 3 |
| 1 | 0 | N/A | N/A | N/A |
| 2 | 0 | 5 | N/A | N/A |
| 4 | 0 | 1 | 5 | 6 |

After the PF and the PO are determined, the UE decodes a physical downlink control channel (PDCCH) at the determined PO time point by using a paging radio network temporary identifier (P-RNTI), and then receives a paging message from a physical downlink shared channel (PDSCH) based on a resource indicated by the PDCCH. When the received paging message includes identification information of the UE, the UE determines itself as paged UE, and connects to the network as instructed by the network.

It can be learned, from the manner of receiving the paging message, that after the UE decodes the PDCCH at the PO time point and further receives the paging message from the PDSCH, the paging message may not include the identification information of the UE. In this case, this is false paging for the UE. For UE in NB-IoT or other UE sensitive to power consumption, excessive false paging leads to a relatively high waste of power consumption during paging message detection. Therefore, for UE sensitive to power consumption, the current paging mechanism is apt to cause wasting of power consumption of the UE.

SUMMARY

Embodiments of the present disclosure provide a data transmission processing method, user equipment, and a base station, to avoid wasting of UE power consumption by preventing UE, particularly UE sensitive to power consumption, from receiving a false paging message.

A first aspect of the present disclosure provides a data transmission processing method, where the method is executed by user equipment, and the method includes:

receiving, by the user equipment, first indication information sent by a base station, and saving context information of the user equipment according to the first indication information, where the context information includes identification information of the user equipment; and decoding, by the user equipment, a physical downlink control channel PDCCH based on the identification information of the user equipment, to obtain second indication information, where the second indication information is used to determine that the user equipment is a paged object or that there is a service of the user equipment.

With reference to the first aspect, in a first possible implementation of the first aspect, the decoding, by the user equipment, a physical downlink control channel PDCCH based on the identification information of the user equipment, to obtain second indication information includes:

if the user equipment correctly decodes a downlink control information DCI format in the PDCCH based on the identification information that identifies the user equipment within a range of the base station or within a range of one or more cells of the base station, determining that the second indication information is successfully obtained; or decoding, by the user equipment, the PDCCH based on the identification information that identifies the user equipment within a range of the base station or with in a range of one or more cells of the base station, to obtain the second indication information included in the DCI format in the PDCCH.

The foregoing solution has the following technical effects: The indication information meant for the paged object, namely, the second indication information, is carried in the PDCCH, so that the user equipment can determine, depending on whether the indication information can be successfully obtained, whether the user equipment is the paged object or has a service, and perform subsequent processing such as a connection to the network when determining that the user equipment is the paged object or has a service. This avoids wasting of UE power consumption.

With reference to the first aspect or the first possible implementation of the first aspect in a second possible implementation of the first aspect, the method further includes:

receiving, by the user equipment obtaining manner indication information sent by the base station, where the obtaining manner indication information is used to indicate an obtaining manner in which the user equipment obtains the second indication information; and the obtaining manner includes at least two of the following manners:

a first obtaining manner, correctly decoding the downlink control information DCI format in the PDCCH based on the identification information that identifies the user equipment within the range of the base station or within the range of the one or more cells of the base station, to obtain the second indication information;

a second obtaining manner: decoding the PDCCH based on the identification information that identifies the user equipment within the range of the base station or within the range of the one or more cells of the base station, to obtain the second indication information included in the DCI format in the PDCCH; and a third obtaining manner; detecting the PDCCH based on a P-RNTI, to obtain the second indication information.

With reference to the first aspect, in a third possible implementation of the first aspect, the decoding, by the user equipment, a physical downlink control channel PDCCH based on the identification information of the user equipment, to obtain second indication information, where the second indication information is used to determine that the user equipment is a paged object or that there is a service of the user equipment, includes:

detecting, by the user equipment, the PDCCH based on a P-RNTI, to obtain the second indication information, where the second indication information is paging message scheduling information: and receiving, by the user equipment from a PDSCH and based on the scheduling information, a paging message corresponding to the user equipment, and determining, based on the paging message, that the user equipment is the paged object or that there is a service of the user equipment.

The foregoing solution has the following technical effect: A plurality of optional obtaining manners are provided for obtaining the indication information meant for the paged object carried in the PDCCH, improving flexibility of obtainment of the indication information.

With reference to any one of the first aspect, or the first to the third possible implementations of the first aspect, in a fourth possible implementation of the first aspect, the decoding, by the user equipment, a physical downlink control channel PDCCH based on the identification information of the user equipment, to obtain second indication information includes:

searching, by the user equipment, common search space CSS or user equipment specific search space USS, and decoding the DCI format in the PDCCH by using the identification information of the user equipment, to obtain the second indication information.

With reference to any one of the first to the fourth possible implementations of the first aspect, in a fifth possible implementation of the first aspect, the DCI format further includes system information change indication information and/or emergency service indication information.

The foregoing solution has the following technical effect: In addition to the second indication information, the DCI format may further carry information used to indicate a system information change, an emergency service, or the like, extending a function of the DCI format, and enabling the UE to learn the corresponding indication information accurately in a timely way.

With reference to any one of the first aspect, or the first to the fifth possible implementations of the first aspect, in a sixth possible implementation of the first aspect, the method further includes:

sending, by the user equipment, a context information saving request to the base station when determining that there is no data that may need to be transmitted/received within a preset time.

With reference to the sixth possible implementation of the first aspect, in a seventh possible implementation of the first aspect, the first indication information is sent by the base station based on the context information saving request.

The foregoing solution has the following technical effect: After determining that the UE has no data that may need to be transmitted, the base station sends, to the UE, indication information used to instruct the UE to save the context information, so that a context information saving occasion and an actual data transmission case of the UE are matched.

This ensures accuracy and reliability of a context information saving operation occasion.

With reference to any one of the first aspect, or the first to the seventh possible implementations of the first aspect, in an eighth possible implementation of the first aspect, the receiving, by the user equipment, first indication information sent by a base station, and saving context information of the user equipment according to the first indication information includes:

saving, according to the first indication information, a security key used for data transmission between the user equipment and the base station and a data packet count for at least one radio bearer, where the security key includes an encryption key and/or an integrity protection key; and after the determining, by the user equipment, that the user equipment is a paged object or that there is a service of the user equipment, the method Further includes:

determining, by the user equipment, a radio bearer that may need to be restored, and performing, by using the security key and the data packet count for the radio bearer, data transmission meant for the radio bearer that may need to be restored.

With reference to the eighth possible implementation of the first aspect, in a ninth possible implementation of the first aspect, the performing, by the user equipment by using the security key and the data packet count for the radio bearer, data transmission meant for the radio bearer that may need to be restored includes:

when determining that there is uplink data that may need to be sent, generating, by the user equipment, an encryption keystream by using the security key and the data packet count for the radio bearer that may need to be restored, and encrypting the uplink data by using the encryption keystream, and sending the encrypted uplink data to the base station.

With reference to the ninth possible implementation of the first aspect, in a tenth possible implementation of the first aspect, the method further includes:

when determining that there is uplink data that may need to be sent, sending, by the user equipment, the uplink data through contention and based on a contention based physical uplink shared channel CB-PUSCH resource pre-allocated by the base station.

With reference to the eighth possible implementation of the first aspect, in an eleventh possible implementation of the first aspect, the performing, by the user equipment by using the security key and the data packet count for the radio bearer, data transmission meant for the radio bearer that may need to be restored includes:

when determining that there is downlink data that may need to be received, decoding, by the user equipment, the received downlink data by using the security key and the data packet count for the radio bearer that may need to be restored.

With reference to any one of the eighth to the eleventh possible implementations of the first aspect, in a twelfth possible implementation of the first aspect, the method further includes:

receiving, by the user equipment, an identifier, sent by the base station, of the radio bearer that may need to be restored; and determining, by the user equipment based on the identifier of the radio bearer that may need to be restored, the radio bearer that may need to be restored.

The foregoing solution has the following technical effect: The UE saves, according to the first indication information, the security key and the data packet count for a plurality of radio bearers, so that when the UE determines, based on the second indication information, that the UE has service data that may need to be transmitted, the uplink data can be transmitted and the downlink data can be received securely and reliably based on the saved information.

With reference to any one of the first aspect, or the first to the twelfth possible implementations of the first aspect, in a thirteenth possible implementation of the first aspect, the decoding, by the user equipment, a physical downlink control channel PDCCH based on the identification information of the user equipment, to obtain second indication information includes:

decoding, by the user equipment, the PDCCH based on the identification information of the user equipment, to obtain any piece of second indication information among second indication information sent by the base station at N different paging occasions POs corresponding to the user equipment, respectively; or decoding, by the user equipment, the PDCCH based on the identification information of the user equipment, to obtain N pieces of second indication information continuously sent by the base station at one PO corresponding to the user equipment and in N−1 consecutive subframes subsequent to the PO.

The foregoing solution has the following technical effect: A plurality of pieces of second indication information used to indicate whether the UE is the paged object or has a service are sent, ensuring paging reliability of the base station. The UE can determine more accurately whether the UE is the paged object or has a service, so that subsequent data transmission is triggered more accurately and reliably.

With reference to the thirteenth possible implementation of the first aspect, in a fourteenth possible implementation of the first aspect, the method further includes:

receiving, by the user equipment, downlink data receiving occasion configuration information sent by the base station, where the downlink data receiving occasion configuration information indicates that the downlink data is received in m subframes subsequent to when the second indication information is obtained, and m is an integer greater than or equal to 0; and after the determining, by the user equipment, that the user equipment is a paged object or that there is a service of the user equipment, the method further includes:

receiving, by the user equipment, the downlink data according to the downlink data receiving occasion configuration information.

The foregoing solution has the following technical effect: On a basis that a plurality of pieces of second indication information are sent, for reception of the downlink data, the UE may directly receive the downlink data reliably according to the downlink data receiving occasion configuration information allocated by the base station.

With reference to any one of the first aspect, or the first to the fourteenth possible implementations of the first aspect, in a fifteenth possible implementation of the first aspect, after the decoding, by the user equipment, a physical downlink control channel PDCCH based on the identification information of the user equipment, to obtain second indication information, the method further includes:

sending, by the user equipment, obtain men t feedback information to the base station by using an obtained uplink feedback resource, where the obtainment feedback information is used to indicate that the user equipment has successfully obtained the second indication information.

With reference to the fifteenth possible implementation of the first aspect, in a sixteenth possible implementation of the first aspect, the uplink feedback resource includes a scheduling request SR resource, or an uplink subframe determined by the base station based on the PO corresponding to the user equipment.

The foregoing solution has the following technical effect: Based on the feedback mechanism that the UE sends a timely feedback to the base station after obtaining the second indication information, a resource allocated by the base station to the UE is more reliable, and wasting is avoided.

With reference to any one of the first aspect, or the first to the sixteenth possible implementations of the first aspect, in a seventeenth possible implementation of the first aspect, after the determining, by the user equipment, that the user equipment is a paged object or that there is a service of the user equipment, the method further includes:

sending, by the user equipment, an RRC connection request message to the base station, where the RRC connection request message includes an RRC connection resumption request message, an RRC connection establishment request message, or an RRC connection re-establishment request message.

With reference to the seventeenth possible implementation of the first aspect, in an eighteenth possible implementation of the first aspect, before the sending, by the user equipment, an RRC connection request message to the base station, the method further includes:

receiving, by the user equipment, resource configuration information sent by the base station, where the resource configuration information includes a CB-PUSCH resource that is determined based on the PO corresponding to the user equipment and one or more POs next to the PO; and the sending, by the user equipment, an RRC connection request message to the base station includes:

sending, by the user equipment, the RRC connection request bused on the CB-PUSCH resource.

With reference to the seventeenth possible implementation of the first aspect, in a nineteenth possible implementation of the first aspect, before the sending, by the user equipment, an RRC connection request message to the base station, the method further includes:

sending, by the user equipment, a resource request to the base station by using an SR resource; and receiving, by the user equipment resource configuration information sent by the base station; and the sending, by the user equipment, an RRC connection request message to the base station includes:

sending, by the user equipment, the RRC connection request message to the base station according to the resource configuration information, where the SR resource includes obtainment feedback information that the second indication information is successfully obtained and/or indication information that there is uplink, data that may need to be transmitted.

The foregoing solution has the following technical effects: When the UE has uplink data that may need to be transmitted or downlink data that may need to be received, the RRC connection request message is sent to resume data transmission. To obtain a resource used to send the RRC connection request message, the UE may proactively request the base station to allocate the resource, so as to send the RRC connection request message by using the resource allocated by the base station; or may send the RRC connection request message through contention and based on the CB-PUSCH resource pro-allocated by the base station. Whichever manner is used, wasting of the resource allocated by the UE is avoided.

A second aspect of the present disclosure provides a data transmission processing method, where the method is executed by a base station, and the method includes:

sending, by the base station, first indication information to user equipment, where the first indication information is used to instruct the user equipment to save context information of the user equipment according to the first indication information, and the context information includes identification information of the user equipment; and sending, by the base station, second indication information by using a PDCCH, where the second indication information is used to instruct the user equipment to determine, when obtaining the second indication information by decoding the PDCCH based on the identification information of the user equipment, that the user equipment is a paged object or that there is a service of the user equipment.

With reference to the second aspect, in a first possible implementation of the second aspect, the second indication information includes a downlink control information DCI format in the PDCCH, or the second indication information is carried in a DCI format; and the identification information of the user equipment is used to identify the user equipment within a range of the base station covering the user equipment or within a range of one or more cells of the base station.

With reference to the second aspect or the first possible implementation of the second aspect, in a second possible implementation of the second aspect, the method further includes:

sending, by the base station, obtaining manner indication information to the user equipment, where the obtaining manner indication information is used to indicate an obtaining manner in which the user equipment obtains the second indication information; and the obtaining manner includes at least two of the following manners:

a first obtaining manner: correctly decoding the downlink control information DCI format in the PDCCH based on the identification information that identifies the user equipment within the range of the base station or within the range of the one or more cells of the base station, to obtain the second indication information;

a second obtaining manner: decoding the PDCCH based on the identification information that identifies the user equipment within the range of the base station or within the range of the one or more cells of the base station, to obtain the second indication information included in the DCI format in the PDCCH: and a third obtaining manner: detecting the PDCCH based on a P-RNTI, to obtain the second indication information.

With reference to the first or the second possible implementation of the second aspect, in a third possible implementation of the second aspect, the DCI format further includes system information change indication information and/or emergency service indication information.

With reference to any one of the second aspect, or the first to the third possible implementations of the second aspect, in a fourth possible implementation of the second aspect, the sending, by the base station, first indication information to user equipment includes:

receiving, by the base station, a context information saving request sent by the user equipment, where the context information saving request is sent by the user equipment when the user equipment determines that there is no data that may need to be transmitted/received within a preset time: and determining, by the base station based on the context information saving request, that the user equipment has not transmitted/received data within the preset time, saving the context information, and sending the first indication information to the user equipment; or saving, by the base station, the context information when determining that the user equipment has no data that may need to be transmitted/received within the preset time, and sending the first indication information to the user equipment.

With reference to any one of the second aspect, or the first to the fourth possible implementations of the second aspect, in a fifth possible implementation of the second aspect, the first indication information is used to instruct the user equipment to save a security key used for data transmission between the user equipment and the base station and a data packet count for at least one radio bearer; after it is determined that the user equipment is the paged object or that there is a service of the user equipment, a radio bearer that may need to be restored is determined; and data transmission meant for the radio bearer that may need to be restored is performed by using the security key and a data packet count for the radio bearer that may need to be restored, where the security key includes an encryption key and/or an integrity protection key.

With reference to the fifth possible implementation of the second aspect, in a sixth possible implementation of the second aspect, the method further includes:

receiving, by the base station, uplink data sent by the user equipment, where the uplink data is sent by the user equipment after the user equipment encrypts the uplink data by using an encryption keystream, and the user equipment generates the encryption key stream when determining that there is uplink data that may need to be sent, by using the security key and the data packet count for the radio bearer that may need to be restored.

With reference to the sixth possible implementation of the second aspect, in a seventh possible implementation of the second aspect, the method further includes:

sending, by the base station, a contention based physical uplink shared channel CB-PUSCH resource to the user equipment, where the CB-PUSCH resource is used to instruct the user equipment to send the uplink data through contention and based on the CB-PUSCH resource.

With reference to the fifth possible implementation of the second aspect, in an eighth possible implementation of the second aspect, the method further includes:

sending, by the base station, downlink data to the user equipment, so that the user equipment decodes, when determining that there is downlink data that may need to be received, the received downlink data by using the security key and the data packet count for the radio bearer that may need to be restored.

With reference to any one of the fifth to the eighth possible implementations of the second aspect, in a ninth possible implementation of the second aspect, the method further includes:

sending, by the base station to the user equipment, an identifier of the radio bearer that may need to be restored, where the identifier of the radio bearer that may need to be restored is used to instruct the user equipment to determine, based on the identifier of the radio bearer that may need to be restored, the radio bearer that may need to be restored.

With reference to any one of the second aspect, or the first to the ninth possible implementations of the second aspect, in a tenth possible implementation of the second aspect, the sending, by the base station, second indication information by using a PDCCH includes:

sending the second indication information by using the PDCCH at each of N different paging occasions PCs corresponding to the user equipment; or continuously send, by using the PDCCH, N pieces of second indication information at one PO corresponding to the user equipment and in N−1 consecutive subframes subsequent to the PO.

With reference to the tenth possible implementation of the second aspect, in an eleventh possible implementation of the second aspect, before the sending, by the base station, second indication information by using a PDCCH, the method further includes:

sending downlink data receiving occasion configuration information to the user equipment, where the downlink data receiving occasion configuration information indicates that the downlink data is received in m subframes subsequent to when the second indication information is obtained, and m is an integer greater than or equal to 0.

With reference to any one of the second aspect, or the first to the eleventh possible implementations of the second aspect, in a twelfth possible implementation of the second aspect, the method further includes:

receiving, by the base station, obtainment feedback information sent by the user equipment by using an uplink feedback resource, where the obtainment feedback information is used to indicate that the user equipment has successfully obtained the second indication information.

With reference to the twelfth possible implementation of the second aspect in a thirteenth possible implementation of the second aspect, before the receiving, by the base station, obtainment feedback information sent by the user equipment by using an uplink feedback resource, the method further includes:

sending, by the base station, uplink feedback resource configuration information to the user equipment, where an uplink feedback resource indicated by the uplink feedback resource configuration information includes a scheduling request SR resource, or an uplink subframe determined based on the PO corresponding to the user equipment.

With reference to any one of the second aspect, or the first to the thirteenth possible implementations of the second aspect, in a fourteenth possible implementation of the second aspect, the method further includes:

receiving, by the base station, an RRC connection request message sent by the user equipment, where the RRC connection request message includes an RRC connection resumption request message, an RRC connection establishment request message, or an RRC connection re-establishment request message.

With reference to the fourteenth possible implementation of the second aspect, in a fifteenth possible implementation of the second aspect, the method further includes:

sending, by the base station, resource configuration information to the user equipment, where the resource configuration information includes a CB-PUSCH resource that is determined based on the PO corresponding to the user equipment and one or more POs next to the PO; and the receiving, by the base station, an RRC connection request message sent by the user equipment includes:

receiving, by the base station, an RRC connection request message sent by the user equipment based on the CB-PUSCH resource.

With reference to the fifteenth possible implementation of the second aspect, in a sixteenth possible implementation of the second aspect the method further includes:

receiving, by the base station, a resource request sent by the user equipment by using an SR resource; and sending, by the base station, resource configuration information to the user equipment; and the receiving, by the base station, an RRC connection request message sent by the user equipment includes:

receiving, by the base station, the RRC connection request message sent by the user equipment according to the resource configuration information, where the SR resource includes obtainment feedback information that the second indication information is successfully obtained and/or indication information that there is uplink data that may need to be transmitted.

A third aspect of the present disclosure provides user equipment, including:

a receiving module, configured to receive first indication information sent by a base station;

a saving module, configured to save context information of the user equipment according to the first indication information, where the context information includes identification information of the user equipment;

an obtaining module, configured to decode a physical downlink control channel PDCCH based on the identification information of the user equipment, to obtain second indication information: and a determining module, configured to: when the obtaining module obtains the second indication information, determine that the user equipment is a paged object or that there is a service of the user equipment.

With reference to the third aspect, in a first possible implementation of the third aspect, the obtaining module includes:

a first obtaining submodule, configured to: if a downlink control information DCI format in the PDCCH is correctly decoded based on the identification information that identifies the user equipment within a range of the base station or within a range of one or more cells of the base station, determine that the second indication information is successfully obtained; or the obtaining module includes;

a second obtaining submodule, configured to decode the PDCCH based on the identification information that identifies the user equipment within a range of the base station or within a range of one or more cells of the base station, to obtain the second indication information included in the DCI format in the PDCCH.

With reference to the third aspect or the first possible implementation of the third aspect, in a second possible implementation of the third aspect, the receiving module is further configured to:

receive obtaining manner indication information sent by the base station, where the obtaining manner indication information is used to indicate an obtaining manner in which the user equipment obtains the second indication information; and the obtaining manner includes at least two of the following manners:

a first obtaining manner: correctly decoding the downlink control information DCI format in the PDCCH based on the identification information that identifies the user equipment within the range of the base station or within the range of the one or more cells of the base station, to obtain the second indication information;

a second obtaining manner: decoding the PDCCH based on the identification information that identifies the user equipment within the range of the base station or within the range of the one or more cells of the base station, to obtain the second indication information included in the DCI formal in the PDCCH; and a third obtaining manner: detecting the PDCCH based on a P-RNTI, to obtain the second indication information.

With reference to the third aspect, in a third possible implementation of the third aspect, the obtaining module includes:

a third obtaining submodule, configured to detect the PDCCH based on a P-RNTI, to obtain the second indication information, where the second indication information is paging message scheduling information; and a fourth obtaining submodule, configured to receive, from a PDSCH and based on the scheduling information, a paging message corresponding to the user equipment; and the determining module is further configured to determine, based on the paging message, that the user equipment is the paged object or that there is a service of the user equipment.

With reference to any one of the first to the third possible implementations of the third aspect, in a fourth possible implementation of the third aspect, the obtaining module is specifically configured to:

search common search space CSS or user equipment specific search space USS, and decode the DCI format in the PDCCH by using the identification information of the user equipment, to obtain the second indication information.

With reference to any one of the first to the fourth possible implementations of the third aspect, in a fifth possible implementation of the third aspect, the DCI format further includes system information change indication information and/or emergency service indication information.

With reference to any one of the third aspect, or the first to the fifth possible implementations of the third aspect, in a sixth possible implementation of the third aspect, the user equipment further includes:

a sending module, configured to send a context information saving request to the base station when it is determined that there is no data that may need to be transmitted/received within a preset time.

With reference to the sixth possible implementation of the third aspect, in a seventh possible implementation of the third aspect, live first indication information is sent by the base station based on the context information saving request.

With reference to any one of the third aspect, or the first to the seventh possible implementations of the third aspect in an eighth possible implementation of the third aspect the saving module is further configured to:

save, according to the first indication information, a security key used for data transmission between the user equipment and the base station and a data packet count for at least one radio bearer, where the security key includes an encryption key and/or an integrity protection key;

the determining module is further configured to determine a radio bearer that may need to be restored; and the user equipment further includes:

a processing module, configured to perform, by using the security key and a data packet count for the radio bearer that may need to be restored, data transmission meant for the radio bearer that may need to be restored.

With reference to the eighth possible implementation of the third aspect, in a ninth possible implementation of the third aspect, the processing module is configured to:

when it is determined that there is uplink data that may need to be sent, generate an encryption keystream by using the security key and the data packet count for the radio bearer that may need to be restored, and encrypt the uplink data by using the encryption keystream; and the sending module is further configured to send the encrypted uplink data to the base station.

With reference to the ninth possible implementation of the third aspect, in a tenth possible implementation of the third aspect, the sending module is further configured to: when it is determined that there is uplink data that may need to be sent, send the uplink data through contention and based on a contention based physical uplink shared channel CB-PUSCH resource pre-allocated by the base station.

With reference to the eighth possible implementation of the third aspect, in an eleventh possible implementation of the third aspect, the processing module is further configured to:

when it is determined that there is downlink data that may need to be received, decode the received downlink data by using the security key and the data packet count for the radio bearer that may need to be restored.

With reference to any one of the eighth to the eleventh possible implementations of the third aspect, in a twelfth possible implementation of the third aspect, the receiving module is further configured to receive an identifier, sent by the base station, of the radio bearer that may need to be restored; and the determining module is further configured to determine, based on the identifier of the radio bearer that may need to be restored, the rad to bearer that may need to be restored.

With reference to any one of the third aspect, or the first to the twelfth possible implementations of the third aspect in a thirteenth possible implementation of the third aspect, the obtaining module is further configured to:

decode the PDCCH based on the identification information of the user equipment, to obtain any piece of second indication information among second indication information sent by the base station at N different paging occasions POs corresponding to the user equipment, respectively; or decode the PDCCH based on the identification information of the user equipment, to obtain N pieces of second indication information continuously sent by the base station at one PO corresponding to the user equipment and in N−1 consecutive subframes subsequent to the PO.

With reference to the thirteenth possible implementation of the third aspect, in a fourteenth possible implementation of the third aspect, the receiving module is further configured to:

receive downlink data receiving occasion configuration information sent by the base station, where the downlink data receiving occasion configuration information indicates that the downlink data is received in m subframes subsequent to when the second indication information is obtained, and m is an integer greater than or equal to 0; and receive the downlink data according to the downlink data receiving occasion configuration information.

With reference to any one of the third aspect, or the first to the fourteenth possible implementations of the third aspect, in a fifteenth possible implementation of the third aspect, the sending module is further configured to:

send obtainment feedback information to the base station by using an obtained uplink feedback resource, where the obtainment feedback information is used to indicate that the user equipment has successfully obtained the second indication information.

With reference to the fifteenth possible implementation of the third aspect, in a sixteenth possible implementation of the third aspect, the uplink feedback resource includes a scheduling request SR resource, or an uplink subframe determined by the base station based on the PO corresponding to the user equipment.

With reference to any one of the third aspect, or the first to the sixteenth possible implementations of the third aspect, in a seventeenth possible implementation of the third aspect, the sending module is further configured to:

send an RRC connection request message to the base station, where the RRC connection request message includes an RRC connection resumption request message, an RRC connection establishment request message, or an RRC connection re-establishment request message.

With reference to the seventeenth possible implementation of the third aspect, in an eighteenth possible implementation of the third aspect, the receiving module is further configured to:

receive resource configuration information sent by the base station, where the resource configuration information includes a CB-PUSCH resource that is determined based on the PO corresponding to the user equipment and one or more POs next to the PO; and the sending module is further configured to:

send the RRC connection request based on the CB-PUSCH resource.

With reference to the seventeenth possible implementation of the third aspect, in a nineteenth possible implementation of the third aspect, the sending module is further configured to send a resource request to the base station by using an SR resource;

the receiving module is further configured to receive resource configuration information sent by the base station; and the sending module is further configured to:

send the RRC connection request message to the base station according to the resource configuration information, where the SR resource includes obtainment feedback information that (he second indication information is successfully obtained and/or indication information that there is uplink data that may need to be transmitted.

A fourth aspect of the embodiments of the present disclosure provides a base station, including:

a sending module, configured to send first indication information to user equipment, where the first indication information is used to instruct the user equipment to save context information of the user equipment according to the first indication information, and the context information includes identification information of the user equipment: and the sending module is further configured to: send second indication information by using a PDCCH, where the second indication information is used to instruct the user equipment to determine, when obtaining the second indication information by decoding the PDCCH based on the identification information of the user equipment, that the user equipment is a paged object or that there is a service of the user equipment.

With reference to the fourth aspect, in a first possible implementation of the fourth aspect, the indication information includes a downlink control information DCI format in the PDCCH, or the second indication information is carried in a DCI format; and the identification information of the user equipment is used to identify the user equipment within a range of the base station covering the user equipment or within a range of one or more cells of the base station.

With reference to the fourth aspect or the first possible implementation of the fourth aspect, in a second possible implementation of the fourth aspect, the sending module is further configured to:

send obtaining manner indication information to the user equipment, where the obtaining manner indication information is used to indicate an obtaining manner in which the user equipment obtains the second indication information; and the obtaining manner includes at least two of the following manners:

a first obtaining manner: correctly decoding the downlink control information DCI formal in the PDCCH based on the identification information that identifies the user equipment within the range of the base station or within the range of the one or more cells of the base station, to obtain the second indication information;

a second obtaining manner: decoding the PDCCH based on the identification information that identifies the user equipment within the range of the base station or within the range of the one or more cells of the base station, to obtain the second indication information included in the DCI format in the PDCCH; and a third obtaining manner: detecting the PDCCH based on a P-RNTI, to obtain the second indication information.

With reference to the first or the second possible implementation of the fourth aspect, in a third possible implementation of the fourth aspect, the DCI format further includes system information change indication information and/or emergency service indication information.

With reference to any one of the fourth aspect, or the first to the third possible implementations of the fourth aspect, in a fourth possible implementation of the fourth aspect, the base station further includes:

a receiving module, configured to receive a context information saving request sent by the user equipment, where the context information saving request is sent by the user equipment when the user equipment determines that there is no data that may need to be transmitted/received within a preset time;

a determining module, specifically configured to determine, based on the context information saving request, that the user equipment has not transmitted/received data within the preset time; and a saving module, configured to save the context information.

With reference to any one of the fourth aspect, or the first to the fourth possible implementations of the fourth aspect, in a fifth possible implementation of the fourth aspect, the first indication information is used to instruct the user equipment to save a security key used for data transmission between the user equipment and the base station and a data packet count for at least one radio bearer; after it is determined that the user equipment is the paged object or that there is a service of the user equipment, a radio bearer that may need to be restored is determined: and data transmission meant for the radio bearer that may need to be restored is performed by using the security key and a data packet count for the radio bearer that may need to be restored, where the security key includes an encryption key and/or an integrity protection key.

With reference to the firth possible implementation of the fourth aspect, in a sixth possible implementation of the fourth aspect, the receiving module is further configured to:

receive uplink data sent by the user equipment, where the uplink data is sent by the user equipment after the user equipment encrypts the uplink data by using an encryption keystream, and the user equipment generates the encryption keystream when determining that there is uplink data that may need to be sent, by using the security key and the data packet count for the radio bearer that may need to be restored.

With reference to the sixth possible implementation of the fourth aspect, in a seventh possible implementation of the fourth aspect, the sending module is further configured to:

send a contention based physical uplink shared channel CB-PUSCH resource to the user equipment, where the CB-PUSCH resource is used to instruct the user equipment to send the uplink data through contention and based on the CB-PUSCH resource.

With reference to the fifth possible implementation of the fourth aspect, in an eighth possible implementation of the fourth aspect, the sending module is further configured to:

send downlink data to the user equipment, so that the user equipment decodes, when determining that there is downlink data that may need to be received, the received downlink data by using the security key and the data packet count for the radio bearer that may need to be restored.

With reference to any one of the fifth to the eighth possible implementations of the fourth aspect, in a ninth possible implementation of the fourth aspect, the sending module is further configured to:

send, to the user equipment, an identifier of the radio bearer that may need to be restored, where the identifier of the radio bearer that may need to be restored is used to instruct the user equipment to determine, based on the identifier of the radio bearer that may need to be restored, the radio bearer that may need to be restored.

With reference to any one of the fourth aspect, or the first to the ninth possible implementations of the fourth aspect, in a tenth possible implementation of the fourth aspect, the sending module is further configured to:

send the second indication information by using the PDCCH at each of N different paging occasions POs corresponding to the user equipment: or continuously send, by using the PDCCH, N pieces of second indication information at one PO corresponding to the user equipment and in N−1 consecutive subframes subsequent to the PO.

With reference to the tenth possible implementation of the fourth aspect, in an eleventh possible implementation of the fourth aspect, the sending module is further configured to:

send downlink data receiving occasion configuration information to the user equipment, where the downlink data receiving occasion configuration information indicates that the downlink data is received in m subframes subsequent to when the second indication information is obtained, and m is an integer greater than or equal to 0.

With reference to any one of the fourth aspect, or the first to the eleventh possible implementations of the fourth aspect, in a twelfth possible implementation of the fourth aspect, the receiving module is further configured to:

receive obtainment feedback information sent by the user equipment by using an uplink feedback resource, where the obtainment feedback information is used to indicate that the user equipment has successfully obtained the second indication information.

With reference to the twelfth possible implementation of the fourth aspect, in a thirteenth possible implementation of the fourth aspect, the sending module is further configured to:

send uplink feedback resource configuration information to the user equipment, where an uplink feedback resource indicated by the uplink feedback resource configuration information includes a scheduling request SR resource, or an uplink subframe determined based on the PO corresponding to the user equipment.

With reference to any one of the fourth aspect, or the first to the thirteenth possible implementations of the fourth aspect in a fourteenth possible implementation of the fourth aspect the receiving module is further configured to:

receive an RRC connection request message sent by the user equipment where the RRC connection request message includes an RRC connection resumption request message, an RRC connection establishment request message, or an RRC connection re-establishment request message.

With reference to the fourteenth possible implementation of the fourth aspect in a fifteenth possible implementation of the fourth aspect the sending module is further configured to:

send resource configuration information to the user equipment, where the resource configuration information includes a CB-PUSCH resource that is determined based on the PC) corresponding to the user equipment and one or more POs next to the PO: and the receiving module is further configured to:
receive an RRC connection request message sent by the user equipment based on the CB-PUSCH resource.

With reference to the fifteenth possible implementation of the fourth aspect, in a sixteenth possible implementation of the fourth aspect, the receiving module is further configured to receive a resource request sent by the user equipment by using an SR resource;

the sending module is further configured to send resource configuration information to the user equipment; and the receiving module is further configured to receive the RRC connection request message sent by the user equipment according to the resource configuration information, where the SR resource includes obtainment feedback information that the second indication information is successfully obtained and/or indication information that there is uplink data that may need to be transmitted.

A fifth aspect of the present disclosure provides user equipment, including:

a receiver, configured to receive first indication information sent by a base station; and a processor, configured to save context information of the user equipment according to the first indication information, where the context information includes identification information of the user equipment;

the processor is further configured to decode a physical downlink control channel PDCCH based on the identification information of the user equipment, to obtain second indication information; and the processor is further configured to: when the obtaining module obtains the second indication information, determine that the user equipment is a paged object or that there is a service of the user equipment.

With reference to the fifth aspect, in a first possible implementation of the fifth aspect, the processor is further configured to:

if a downlink control information DCI format in the PDCCH is correctly decoded based on the identification information that identifies the user equipment within a range of the base station or within a range of one or more cells of the base station, determine that the second indication information is successfully obtained: or the processor is further configured to:
decode the PDCCH based on the identification information that identifies the user equipment within a range of the base station or within a range of one or more cells of the base station, to obtain the second indication information included in the DCI format in the PDCCH.

With reference to the fifth aspect or the first possible implementation of the fifth aspect, in a second possible implementation of the fifth aspect, the receiver is further configured to:

receive obtaining manner indication information sent by the base station, where the obtaining manner indication information is used to indicate an obtaining manner in which the user equipment obtains the second indication information; and the obtaining manner includes at least two of the following manners:

a first obtaining manner: correctly decoding the downlink control information DCI format in the PDCCH based on the identification information that identifies the user equipment within the range of the base station or within the range of the one or more cells of the base station, to obtain the second indication information;

a second obtaining manner; decoding the PDCCH based on the identification information that identifies the user equipment within the range of the base station or within the range of the one or more cells of the base station, to obtain the second indication information included in the DCI format in the PDCCH; and a third obtaining manner: detecting the PDCCH based on a P-RNTI, to obtain the second indication information.

With reference to the fifth aspect, in a third possible implementation of the fifth aspect, the processor is further configured to:

detect the PDCCH based on a P-RNTI, to obtain the second indication information, where the second indication information is paging message scheduling information;

receive, from a PDSCH and based on the scheduling information, a paging message corresponding to the user equipment; and determine, based on the paging message, that the user equipment is the paged object or that there is a service of the user equipment.

With reference to any one of the first to the third possible implementations of the fifth aspect, in a fourth possible implementation of the fifth aspect, the processor is further configured to:

search common search space CSS or user equipment specific search space USS, and decode the DCI format in the PDCCH by using the identification information of the user equipment, to obtain the second indication information.

With reference to any one of the first to the fourth possible implementations of the fifth aspect in a fifth possible implementation of the first aspect, the DCI format further includes system information change indication information and/or emergency service indication information.

With reference to any one of the fifth aspect, or the first to the fifth possible implementations of the fifth aspect, in a sixth possible implementation of the fifth aspect, the user equipment further includes:

a transmitter, configured to send a context information saving request to the base station when it is determined that there is no data that may need to be transmitted/received within a preset time.

With reference to the sixth possible implementation of the fifth aspect, in a seventh possible implementation of the fifth aspect, the first indication information is sent by the base station based on the context information saving request.

With reference to any one of the fifth aspect, or the first to the seventh possible implementations of the fifth aspect, in an eighth possible implementation of the fifth aspect, the processor is further configured to:

save, according to the first indication information, a security key used for data transmission between the user equipment and the base station and a data packet count for at least one radio bearer, where the security key includes an encryption key and/or an integrity protection key;

the processor is further configured to determine a radio bearer that may need to be restored; and the processor is further configured to perform, by using the security key and a data packet count for the radio bearer that may need to be restored, data transmission meant for the radio bearer that may need to be restored.

With reference to the eighth possible implementation of the fifth aspect, in a ninth possible implementation of the fifth aspect, the processor is further configured to:

when it is determined that there is uplink data that may need to be sent, generate an encryption keystream by using the security key and the data packet count for the radio bearer that may need to be restored, and encrypt the uplink data by using the encryption keystream; and the transmitter is further configured to send the encrypted uplink data to the base station.

With reference to the ninth possible implementation of the fifth aspect, in a tenth possible implementation of the fifth aspect, the transmitter is further configured to: when it is determined that there is uplink data that may need to be sent, send the uplink data through contention and based on a contention based physical uplink shared channel CB-PUSCH resource pre-allocated by the base station.

With reference to the eighth possible implementation of the fifth aspect, in an eleventh possible implementation of the fifth aspect the processor is further configured to:

when it is determined that there is downlink data that may need to be received, decode the received downlink data by using the security key and the data packet count for the radio bearer that may need to be restored.

With reference to any one of the eighth to the eleventh possible implementations of the fifth aspect, in a twelfth possible implementation of the fifth aspect, the receiver is further configured to receive an identifier, sent by the base station, of the radio bearer that may need to be restored; and the processor is further configured to determine, based on the identifier of the radio bearer that may need to be restored, the rad to bearer that may need to be restored.

With reference to any one of the fifth aspect, or the first to the twelfth possible implementations of the fifth aspect, in a thirteenth possible implementation of the fifth aspect, the processor is further configured to:

decode the PDCCH based on the identification information of the user equipment, to obtain any piece of second indication information among second indication information sent by the base station at N different paging occasions POs corresponding to the user equipment, respectively; or decode the PDCCH based on the identification information of the user equipment, to obtain N pieces of second indication information continuously sent by the base station at one PO corresponding to the user equipment and in N−1 consecutive subframes subsequent to the PO.

With reference to the thirteenth possible implementation of the fifth aspect, in a fourteenth possible implementation of the fifth aspect, the receiver is further configured to:

receive downlink data receiving occasion configuration information sent by the base station, where the downlink data receiving occasion configuration information indicates that the downlink data is received in m subframes subsequent to when the second indication information is obtained, and m is an integer greater than or equal to 0; and receive the downlink data according to the downlink data receiving occasion configuration information.

With reference to any one of the fifth aspect, or the first to the fourteenth possible implementations of the fifth aspect, in a fifteenth possible implementation of the fifth aspect, the transmitter is further configured to:

send obtainment feedback information to the base station by using an obtained uplink feedback resource, where the obtainment feedback information is used to indicate that the user equipment has successfully obtained the second indication information.

With reference to the fifteenth possible implementation of the fifth aspect, in a sixteenth possible implementation of the fifth aspect, the uplink feedback resource includes a scheduling request SR resource, or an uplink subframe determined by the base station based on the PO corresponding to the user equipment.

With reference to any one of the fifth aspect, or the first to the sixteenth possible implementations of the fifth aspect, in a seventeenth possible implementation of the fifth aspect, the transmitter is further configured to:

send an RRC connection request message to the base station, where the RRC connection request message includes an RRC connection resumption request message, an RRC connection establishment request message, or an RRC connection re-establishment request message.

With reference to the seventeenth possible implementation of the fifth aspect, in an eighteenth possible implementation of the fifth aspect, the receiver is further configured to:

receive resource configuration information sent by the base station, where the resource configuration information includes a CB-PUSCH resource that is determined based on the PO corresponding to the user equipment and one or more POs next to the PO; and the transmitter is further configured to:

send the RRC connection request based on the CB-PUSCH resource.

With reference to the seventeenth possible implementation of the fifth aspect, in a nineteenth possible implementation of the fifth aspect, the transmitter is further configured to send a resource request to the base station by using an SR resource:

the receiver is further configured to receive resource configuration information sent by the base station; and the transmitter is further configured to:

send the RRC connection request message to the base station according to the resource configuration information, where the SR resource includes obtainment feedback information that the second indication information is successfully obtained and/or indication information that there is uplink data that may need to be transmitted.

A sixth aspect of the present disclosure provides a base station, including:

a transmitter, configured to send first indication information to user equipment, where the first indication information is used to instruct the user equipment to save context information of the user equipment according to the first indication information, and the context information includes identification information of the user equipment: and the transmitter is further configured to: send second indication information by using a PDCCH, where the second indication information is used to instruct the user equipment to determine, when obtaining the second indication information by decoding the PDCCH based on the identification information of the user equipment, that the user equipment is a paged object or that there is a service of the user equipment.

With reference to the sixth aspect, in a first possible implementation of the sixth aspect, the indication information includes a downlink control information DCI formal in the PDCCH, or the second indication information is carried in a DCI format; and the identification information of the user equipment is used to identify the user equipment within a range of the base station covering (he user equipment or within a range of one or more cells of the base station.

With reference to the sixth aspect or the first possible implementation of the sixth aspect, in a second possible implementation of the sixth aspect, the transmitter is further configured to:

send obtaining manner indication information to the user equipment, where the obtaining manner indication information is used to indicate an obtaining manner in which the user equipment obtains the second indication information; and the obtaining manner includes at least two of the following manners;

a first obtaining manner: correctly decoding the downlink control information DCI format in the PDCCH based on the identification information that identifies the user equipment within the range of the base station or within the range of the one or more cells of the base station, to obtain the second indication information;

a second obtaining manner: decoding the PDCCH based on the identification information that identifies the user equipment within the range of the base station or within the range of the one or more cells of the base station, to obtain the second indication information included in the DCI format in the PDCCH; and a third obtaining manner: detecting the PDCCH based on a P-RNTI, to obtain the second indication information.

With reference to the first or the second possible implementation of the sixth aspect, in a third possible implementation of the sixth aspect, the DCI format further includes system information change indication information and-or emergency service indication information.

With reference to any one of the sixth aspect, or the first to the third possible implementations of the sixth aspect, in a fourth possible implementation of the sixth aspect, the base station further includes:

a receiver, configured to receive a context information saving request sent by the user equipment, where the context information saving request is sent by the user equipment when the user equipment determines that there is no data that may need to be transmitted/received within a preset time; and a processor, configured to: determine, based on the context information saving request, that the user equipment has not transmitted received data within the preset time; and save the context information; or the processor is further configured to:

save the context information when it is determined that the user equipment has no data that may need to be transmitted/received within the preset time, and send the context saving indication information to the user equipment.

With reference to any one of the sixth aspect, or the first to the fourth possible implementations of the sixth aspect, in a fifth possible implementation of the sixth aspect, the first indication information is used to instruct the user equipment to save a security key used for data transmission between the user equipment and the base station and a data packet count for at least one radio bearer: after it is determined that the user equipment is the paged object or that there is a service of the user equipment, a radio bearer that may need to be restored is determined; and data transmission meant for the radio bearer that may need to be restored is performed by using the security key and a data packet count for the radio bearer that may need to be restored, where the security key includes an encryption key and/or an integrity protection key.

With reference to the fifth possible implementation of the sixth aspect, in a sixth possible implementation of the sixth aspect, the receiver is further configured to:

receive uplink data sent by the user equipment, where the uplink data is sent by the user equipment after the user equipment encrypts the uplink data by using an encryption keystream, and the user equipment generates the encryption keystream when determining that there is uplink data that may need to be sent, by using the security key and the data packet count for the radio bearer that may need to be restored.

With reference to the sixth possible implementation of the sixth aspect, in a seventh possible implementation of the sixth aspect, the transmitter is further configured to:

send a contention based physical uplink shared channel CB-PUSCH resource to the user equipment, where the CB-PUSCH resource is used to instruct the user equipment to send the uplink data through contention and based on the CB-PUSCH resource.

With reference to the fifth possible implementation of the sixth aspect, in an eighth possible implementation of the sixth aspect, the transmitter is further configured to:

send downlink data to the user equipment, so that the user equipment decodes, when determining that there is downlink data that may need to be received, the received downlink data by using the security key and the data packet count for the radio bearer that may need to be restored.

With reference to any one of the fifth to the eighth possible implementations of the sixth aspect, in a ninth possible implementation of the sixth aspect, the transmitter is further configured to:

send, to the user equipment, an identifier of the radio bearer that may need to be restored, where the identifier of the radio bearer that may need to be restored is used to instruct the user equipment to determine, based on the identifier of the radio bearer that may need to be restored, the radio bearer that may need to be restored.

With reference to any one of the sixth aspect, or the first to the ninth possible implementations of the sixth aspect, in a tenth possible implementation of the sixth aspect, the transmitter is further configured to:

send the second indication information by using the PDCCH at each of N different paging occasions POs corresponding to the user equipment; or continuously send, by using the PDCCH, N pieces of second indication information at one PO corresponding to the user equipment and in N-1 consecutive subframes subsequent to the PO.

With reference to the tenth possible implementation of the sixth aspect, in an eleventh possible implementation of the sixth aspect, the transmitter is further configured to:

send downlink data receiving occasion configuration information to the user equipment, where the downlink data receiving occasion configuration information indicates that the downlink data is received in m subframes subsequent to when the second indication information is obtained, and m is an integer greater than or equal to 0.

With reference to any one of the sixth aspect, or the first to the eleventh possible implementations of the sixth aspect, in a twelfth possible implementation of the sixth aspect, the receiver is further configured to:

receive obtainment feedback information sent by the user equipment by using an uplink feedback resource, where the obtainment feedback information is used to indicate that the user equipment has successfully obtained the second indication information.

With reference to the twelfth possible implementation of the sixth aspect, in a thirteenth possible implementation of the sixth aspect, the transmitter is further configured to:

send uplink feedback resource configuration information to the user equipment, where an uplink feedback resource indicated by the uplink feedback resource configuration information includes a scheduling request SR resource, or an uplink subframe determined based on the PO corresponding to the user equipment.

With reference to any one of the sixth aspect, or the first to the thirteenth possible implementations of the sixth aspect, in a fourteenth possible implementation of the sixth aspect, the receiver is further configured to:

receive an RRC connection request message sent by the user equipment, where the RRC connection request message includes an RRC connection resumption request message, an RRC connect ton establishment request message, or an RRC connection re-establishment request message.

With reference to the fourteenth possible implementation of the sixth aspect, in a fifteenth possible implementation of the sixth aspect, the transmitter is further configured to:

send resource configuration information to the user equipment, where the resource configuration information includes a CB-PUSCH resource that is determined based on the PO corresponding to the user equipment and one or more POs next to the PO; and the receiver is further configured to:

receive an RRC connection request message sent by the user equipment based on the CB-PUSCH resource.

With reference to the fifteenth possible implementation of the sixth aspect, in a sixteenth possible implementation of the sixth aspect, the receiver is further configured to receive a resource request sent by the user equipment by using an SR resource;

the transmitter is further configured to send resource configuration information to the user equipment; and the receiver is further configured to receive the RRC connection request message sent by the user equipment according to the resource configuration information, where the SR resource includes obtainment feedback information that the second indication information is successfully obtained and/or indication information that there is uplink data that may need to be transmitted.

According to the data transmission processing method, the user equipment, and the base station that are provided in the present disclosure, after receiving the first indication information sent by the base station, the user equipment saves the context information of the user equipment according to the first indication information. The context information includes the identification information of the user equipment. Further, the user equipment decodes the PDCCH based on the identification information, and if the second indication information used to indicate that the user equipment is the paged object or that there is a service of the user equipment can be obtained through decoding, the user equipment is the paged object or has a service that may need to be transmitted/received. The indication information meant for the paged object is carried in the PDCCH, so that the user equipment can determine, depending on whether the indication information can be successfully obtained, whether the user equipment is the paged object or has a service, and perform subsequent processing, for example, connecting to a network, when determining that the user equipment is the paged object or has a service. This avoids wasting of UE power consumption.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show some embodiments of the present disclosure, and persons of ordinary skill in the art may still derive other drawings front these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
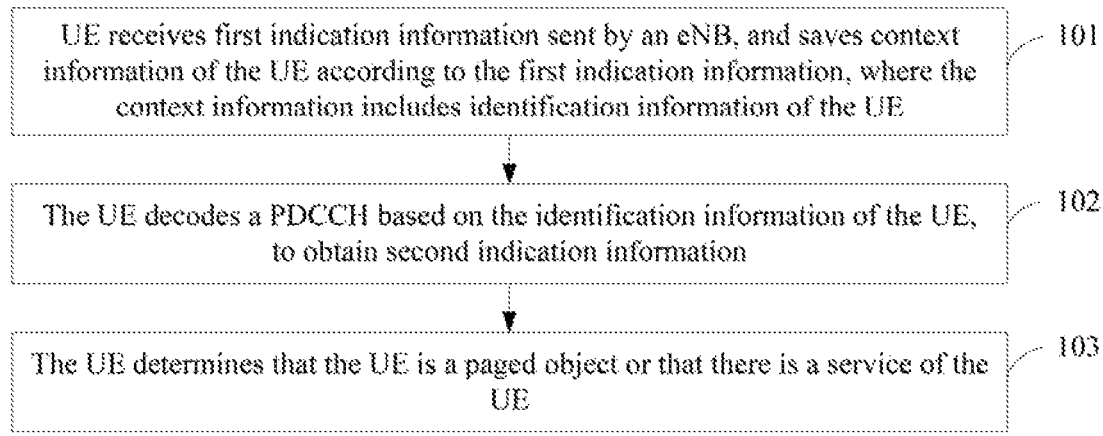
FIG. 1 is a flowchart of Embodiment 1 of a data transmission processing method according to an embodiment of the present disclosure.

FIG. 1 is a flowchart of Embodiment 1 of a data transmission processing method according to an embodiment of the present disclosure. As shown in FIG. 1, this solution is executed by user equipment (UE). The data transmission processing method includes the following steps.

Step 101. The UE receives first indication information sent by an eNB, and saves context information of the UE according to the first indication information, where the context information includes identification information of the UE.

The eNB sends the first indication information to the UE when determining that the UE has not transmitted/received data within a preset time.

Specifically, the eNB may use the following optional manners to determine whether the UE has transmitted/received data within the preset time.

Manner 1: In a process in which the UE performs data transmission with a network, after current transmission of data is complete, if there is no data Dial may need to be transmitted/received subsequently within a specified time, that is, when determining that there is no data that may need to be transmitted/received within the preset time, the UE sends a context information saving request to the eNB, to cause the eNB to save the context information of the UE, that is, to request the eNB to save the context information of the UE. In this case, the first indication information is sent by the eNB based on the context information saving request. When receiving the context information saving request, the eNB determines that the UE has no subsequent data that may need to be transmitted/received within the time, and may send a context saving indication message to the UE. The context saving indication message carries the first indication information.

It should be noted that saving the context information of the UE is saving the context information on a UE side and on a network side, to be specific, the eNB. In addition, during specific implementation, the context information saving request may also be referred to as an RRC connection suspension request message, or the like. The context saving indication message carrying the first indication information may also be referred to as an RRC connection suspension indication message, an RRC connection release indication message, or the like, without any specific limitation.

Manner 2: The first indication information is sent by the eNB based on a record of data transmission with the UE when the eNB determines that no data transmission with the UE is performed within the preset time, fit this manner, when determining, depending on a status of data transmission with the UE, that the UE has no subsequent data that may need to be transmitted/received, the eNB may automatically determine that saving the context information of the UE (or equivalently referred to as RRC connection suspension or release) may be performed, so as to send the first indication information to the UE.

It should be noted that after determining that the UE has not transmitted/received data within the specified time, the eNB does not send the first indication information to the UE immediately, but need to interact with core network devices, an MME and an SGW, to complete related processing on the network side, for example, UE bearer suspension processing, and sends the first indication information to the UE after the related processing is complete. Interaction between the eNB and the core network devices is described in a subsequent embodiment, and details are not described in this embodiment.

Further, after receiving the first indication information sent by the eNB, the UE saves the context information. Generally, the context information may include one or more of: radio resource configuration information of the UE, a security algorithm, a UE identifier or the identification information of the UE, measurement configuration information, and the like. The radio resource figuration information may include one or more of: physical layer configuration information, MAC layer configuration information, RLC layer configuration information, and PDCP layer configuration information. The identification information of the UE includes, for example, a C-RNTI.

It should be noted that the first indication information is usually sent based on the following communication scenario: After the UE communicates with a base station by using the context information, if no data transmission may need to be performed subsequently within the specified time, the UE may change into an RRC idle state from an RRC connected state, and delete the context information. To ensure that network transmission can be quickly resumed based on the context information subsequently, the base station may immediately instruct the UE to save the context information after determining that the UE has not transmitted/received data within the specified time. In this case, a stale of the UE is not limited. The UE may be in an RRC idle state, an RRC connected stale, or an RRC suspended state. In this way, when the PDCCH is received, the user equipment identifier in the context information may be used to detect second indication information included in the PDCCH.

Step 102. The UE decodes a PDCCH based on the identification information of the UE, to obtain second indication information.

Step 103. The UE determines that the UE is a paged object or that there is a service of the UE.

In this embodiment, the identification information of the UE may he used to uniquely identify the UE within a range of the eNB serving the UE or within a range of one or more cells of the eNB.

During actual application, if the eNB may need to page given UE, the PDCCH is scrambled by using identification information of the UE, so as to send the indication information.

Optionally, the decoding a PDCCH based on the identification information of the UE, to obtain second indication information may be implemented in the following manner 1. if a downlink control information (DCI) format in the PDCCH is correctly decoded based on the identification information of the UE, determining that the second indication information is successfully obtained; or 2. decoding the PDCCH based on the identification information of the UE, to obtain the second indication information included in a DCI format in the PDCCH.

To be specific, in this embodiment, it may be defined that, if the UE has correctly decoded a preset downlink control information DCI format in the PDCCH by using the identification information of the UE, the UE is a paged object or has a service. In other words, the second indication information indicating that the UE is the paged object or has a service is obtained. Alternatively, a bit definition of second indication information may be added to a preset DCI format, and if the UE obtains, through decoding by using the identification information of the UE, the second indication information that is included in the DCI format in the PDCCH and that indicates that the UE is the paged object or has a service, the UE is the paged object or has a service.

Specifically, only one bit may be included in the DCI format. For example, when the bit is 1, it may indicate that the UE is paged and may need to be connected to a network to transmit/receive data. When the bit is 0, the UE is not paged currently.

In specific implementation, the UE may search common search space (CSS) or UE specific search space (USS), and decode the preset DCI format in the PDCCH by using the identification information of the UE, to obtain the second indication information.

In addition, optionally, in addition to the second indication information used to indicate whether the UE is the paged object or has a service, the DCI format may further include system information change indication information and/or emergency service indication information. Using the system information change indication information as an example, the DCI format may be designed as follows:

the first bit: paging indication information used to indicate whether UE is paged; and the second bit: system information change indication information used to notify whether system information has changed.

Further, the DCI format may further include the following emergency service indication information, for example, earthquake and tsunami warning system indication (Earthquake and Tsunami Warning System Indication, ETWS for short) information, commercial mobile alert service (CMAS) information, and extended access barring parameter modification (EABPM) indication information.

In this embodiment, after receiving the first indication information sent by the eNB, the UE saves the context information of the UE according to the first indication information. The context information includes the identification information of the UE. Further, the UE decodes the PDCCH based on the identification information, and if the second indication information used to indicate that the UE is the paged object or that there is a service of the UE can be obtained through decoding, the UE is the paged object or has a service that may need to be transmitted/received. The indication information meant for the paged object is carried in the PDCCH, so that the UE can determine, depending on whether the indication information can be successfully obtained, whether the UE is the paged object or has a service, and perform subsequent processing, for example, connecting to a network, when determining that the UE is the paged object or has a service. This avoids wasting of UE power consumption.

Figure 2:
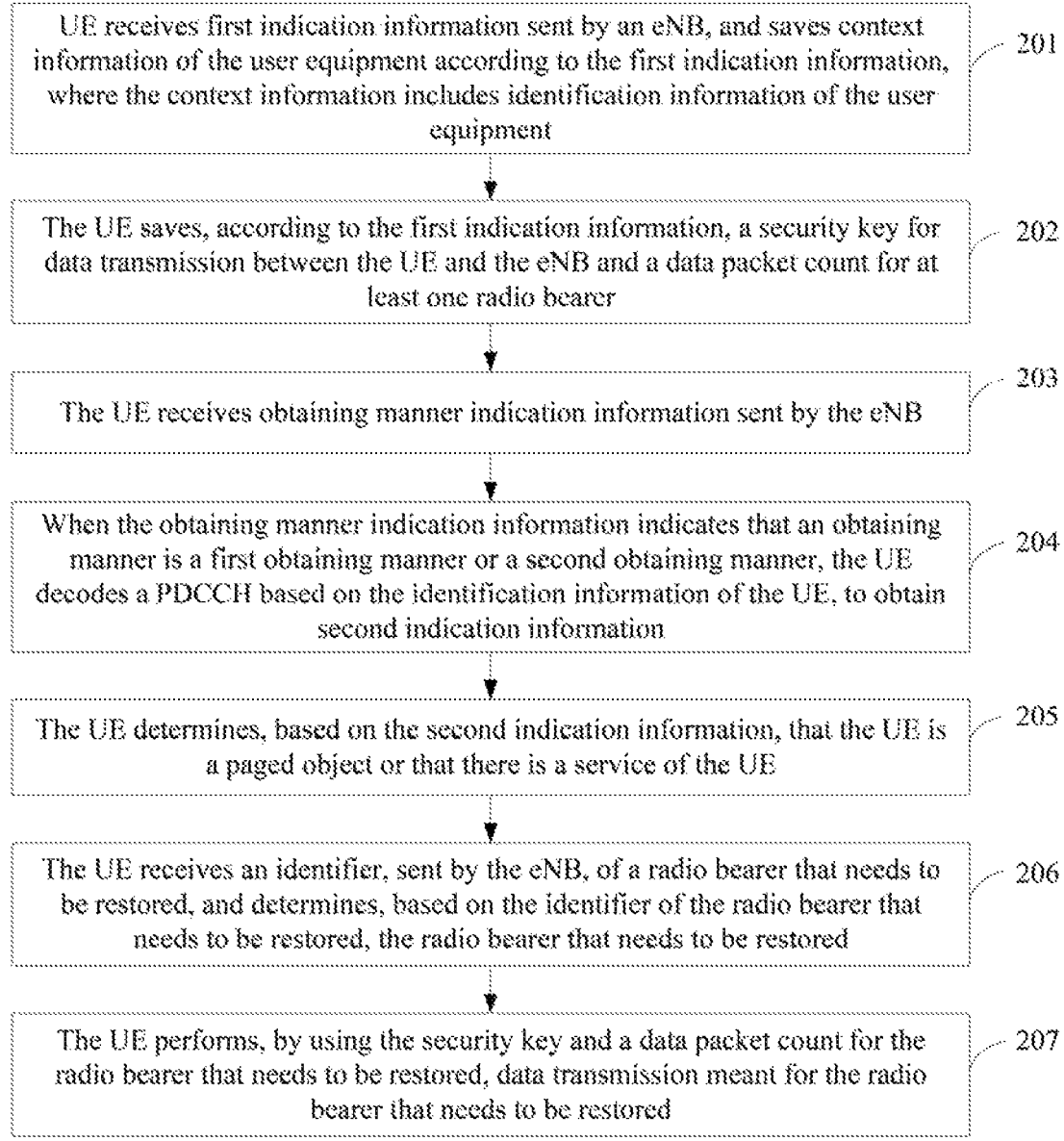
FIG. 2 is a flowchart of Embodiment 2 of a data transmission processing method according to an embodiment of the present disclosure.

FIG. 2 is a flowchart of Embodiment 2 of a data transmission processing method according to an embodiment of the present disclosure. As shown in FIG. 2, the method specifically includes the following steps.

Step 201. UE receives first indication information sent by an eNB, and saves context information of the user equipment according to the first indication information, where the context information includes identification information of the user equipment.

Step 202. The UE saves, according to the first indication information, a security key for data transmission between the UE and the eNB and a data packet count for at least one radio bearer.

The security key includes an encryption key and/or an integrity protection key.

In this embodiment, in addition to saving the context information, the UE also saves the security key and the data packet count, or referred to as a data packet sequence number.

The data packet count may be a data packet count compliant with the Packet Data Convergence Protocol (PDCP), namely, PDCP COUNT.

For example, in a current LTE system, a PDCP COUNT format is as follows: A count value includes an HFN and a PDCP SN:

| HFN | PDCP SN |
| --- | --- |

It can be understood that if a data security processing process is not performed at a PDCP layer, but at another protocol layer, a type of the count changes adaptively.

Specifically, the following two optional manners may be used to save the data packet count:

method 1: saving a next data packet count to be used; for example, when data transmission has proceeded to a fifth data packet, a count 6 is saved during saving and then is to be used when data transmission is resumed; and method 2: saving a last effective data packet count currently used; for example, when data transmission has proceeded to a fifth data packet, a count 5 is saved, and for next use, 1 is added so that resumed data transmission starts with a count 6.

Step 203. The UE receives obtaining manner indication information sent by the eNB.

The obtaining manner indication information is used to indicate an obtaining manner in which the UE obtains second indication information.

Timing of step 203 is not strictly limited, and is not limited to the timing relationship in this embodiment.

The obtaining manner includes at least two of the following manners:

a first obtaining manner: correctly decoding, by the UE, a DCI format in a PDCCH based on the identification information that identifies the UH within a range of the eNB or within a range of one or more cells of the eNB, to obtain the second indication information;

a second obtaining manner: decoding, by the UE, a PDCCH based on the identification information that identifies the UE within a range of the eNB or within a range of one or more cells of the eNB, to obtain the second indication information included in a DCI format in the PDCCH; or a third obtaining manner: detecting, by the UE, a PDCCH based on a P-RNTI, to obtain the second indication information.

In the former two manners, the identification information of the UE mainly refers to a C-RNTI used to uniquely identify the UE. In the third manner, the P-RNTI docs not uniquely identify the UE, and is common identification information.

Step 204. When the obtaining manner indication information indicates that an obtaining manner is a first obtaining manner or a second obtaining manner, the UE decodes a PDCCH based on the identification information of the UE, to obtain second indication information.

The processes of obtaining the indication information in the former two obtaining manners have been described in the foregoing embodiment, and are not further detailed in this embodiment.

When the obtaining manner indication information indicates the third obtaining manner, the UE detects the PDCCH based on the P-RNTI, to obtain the second indication information. In this case, the second indication information is paging message scheduling information. Further, the UE receives, from a PDSCH and based on the scheduling information, a paging message corresponding to the UE, and determines, based on the paging message, that the UE is a paged object or that there is a service of the UE. The scheduling information refers to a time-frequency resource for receiving the paging message on the PDSCH.

Step 205. The UE determines, based on the second indication information, that the UE is a paged object or that there is a service of the UE.

Step 206. The UE receives an identifier, sent by the eNB, of a radio bearer that may need to be restored, and determines, based on the identifier of the radio bearer that may need to be restored, the radio bearer that may need to be restored.

The identifier of the radio bearer may be included in the second indication information, or may be included in the paging message.

Step 207. The UE performs, by using the security key and a data packet count for the radio bearer that may need to be restored, data transmission meant for the radio bearer that may need to be restored.

In this case, corresponding to the foregoing two saving methods, a specific data transmission method may be executed in two manners:

manner 1: corresponding to method 1, where the data transmission starts with a saved 6; and manner 2: corresponding to method 2, where 1 is added to a saved 5 so that the data transmission starts with 6.

In this embodiment, after initiating paging or service processing for the UE, the eNB determines, based on service processing that may need to be performed, the identifier of the corresponding radio bearer that may need to be restored, and sends, to the UE, the identifier of the radio bearer that may need to be restored; in this case, the UE determines, based on the identifier of the radio bearer that may need to be restored, the radio bearer that may need to be restored, and further performs, by using the saved security key and the saved data packet count for the radio bearer that may need to be restored, data transmission meant for the radio bearer that may need to be restored.

Specifically, when the UE has uplink data that may need to be sent, the performing, by the UE, data transmission meant for the radio bearer that may need to be restored includes: generating an encryption keystream by using the security key and the data packet count for the radio bearer that may need to be restored, encrypting the uplink data by using the encryption keystream, and sending the encrypted uplink data to the eNB.

Specifically, for sending of the encrypted uplink data by the UE, the uplink data may be sent through contention and based on a contention based physical uplink shared channel (CB-PUSCH) resource pre-allocated by the eNB.

Specifically, when having downlink data that may need to be received, the UE decodes the received downlink data by using the security key and the data packet count for the radio bearer that may need to be restored.

It should be noted that after the UE obtains the second indication information indicating that the UE is the paged object or has a service, the UE has downlink data that may need to be received, and triggers the downlink data receiving processing. If having uplink data that may need to be sent in this process, the UE triggers the uplink data sending processing.

In this embodiment, the second indication information meant for the paged object is carried in the PDCCH, so that the UE can determine, depending on whether the second indication information can be successfully obtained, whether the UE is the paged object or has a service, and perform data transmission processing when determining that the UE is the paged object or has a service. This avoids wasting of UE power consumption.

Figure 3:
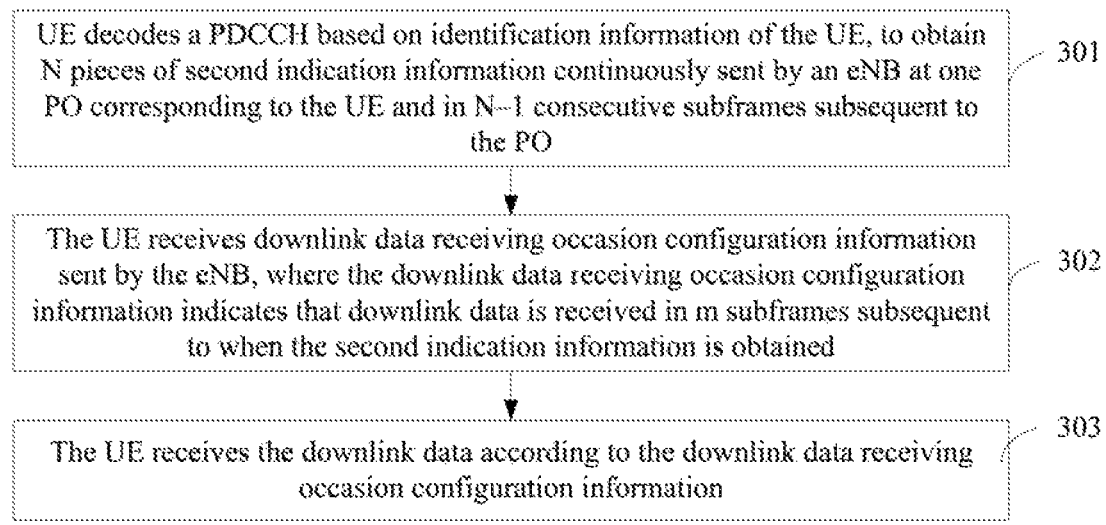
FIG. 3 is a flowchart of Embodiment 3 of a data transmission processing method according to an embodiment of the present disclosure.

FIG. 3 is a flowchart of Embodiment 3 of a data transmission processing method according to an embodiment of the present disclosure. As shown in FIG. 3, based on the foregoing embodiments, that the UE decodes a PDCCH based on the identification information of the UE, to obtain second indication information may be implemented by using step 301:

Step 301. The UE decodes the PDCCH based on the identification information of the UE, to obtain N pieces of second indication information continuously sent by the eNB at one PO corresponding to the UE and in N−1 consecutive subframes subsequent to the PO.

Optionally, that the UE decodes a PDCCH based on the identification information of the UE, to obtain second indication information may alternatively be implemented in the following manner:

decoding, by the UE, the PDCCH based on the identification information of the UE, to obtain any piece of second indication information among second indication information sent by the base station at N different paging occasions PCs corresponding to the user equipment, respectively.

Further, after the second indication information is obtained, the following steps of receiving downlink data may be further included:

Step 302. The UE receives downlink data receiving occasion configuration information sent by the eNB, where the downlink data receiving occasion configuration information indicates that downlink data is received in in subframes subsequent to when the second indication information is obtained.

Step 303. The UE receives the downlink data according to the downlink data receiving occasion configuration information.

Herein, m is an integer greater than or equal to 0.

In this embodiment, the solution of sending a plurality of pieces of second indication information used to indicate whether the UE is a paged object or has a service is provided, to ensure paging reliability, to be specific, to ensure that the UE can determine more accurately whether the UE is the paged object or has a service, so that subsequent data transmission is triggered more accurately and reliably.

Specifically, after sending the N pieces of second indication information, the eNB may directly send the downlink data to the UE. The N pieces of second indication information may be sent continuously or discontinuously.

Specifically, in the continuous sending manner, the eNB calculates one PO corresponding to the UE and sends the N pieces of second indication information continuously at the PO and in the N−1 consecutive subframes subsequent to the PO. Specifically, the PDCCH is scrambled by using the identification information of the UE, to send a preset DCI formal carrying the second indication information for N times or send a preset DCI format for N times, and the downlink data may be sent to the UE directly after the preset DCI format is sent for N times. Correspondingly, tire UE decodes the PDCCH based on the identification information of the UE, and attempts to receive tire downlink data after obtaining the N pieces of second indication information continuously sent by the eNB at the PO corresponding to tire UE and in the N−1 consecutive subframes subsequent to the PO.

It should be noted that in this manner, an occasion for the eNB to send the downlink data by the eNB may follow the m subframes subsequent to when the N pieces of second indication information are sent continuously. Correspondingly, the UE receives the downlink data after the m subframes subsequent to when the N pieces of second indication information are obtained.

In the discontinuous sending manner, the eNB calculates N different POs corresponding to the UE, and sends the second indication information at each PO by using the PDCCH. Correspondingly, the UE attempts to receive the downlink data after decoding the PDCCH based on the identification information of the UE and obtaining any piece of second indication information among second indication information sent by the eNB at the N different POs corresponding to the UE, respectively. In this manner, because the UE is unaware which second indication information sent by live eNB is the indication information obtained by the UE, the UE attempts to receive the downlink data immediately after obtaining the second indication information.

In an embodiment shown in FIG. 3, after the UE determines that the UE is the paged object or has a service, if there is downlink data that may need to be received, to be specific, if the second indication information is received indicating that the UE has downlink data that may need to be received, the UE can directly receive the downlink data in the manner in this embodiment. If the UE has uplink data that may need to be sent, the UE usually may need to request a resource from the eNB, so as to send the uplink data based on the resource allocated by the eNB. This relates to a data transmission resumption processing process, and details arc described in later embodiments. For a downlink data receiving process and an uplink data sending process, refer to specific descriptions in the embodiment of FIG. 2.

It should be noted that the data transmission resumption process may be triggered by not only uplink data sending, but also downlink data receiving. However, in the embodiment in FIG. 3, based on the foregoing two optional second indication information sending manners, the eNB may send the downlink data immediately after the N pieces of second indication information are sent.

Figure 4:
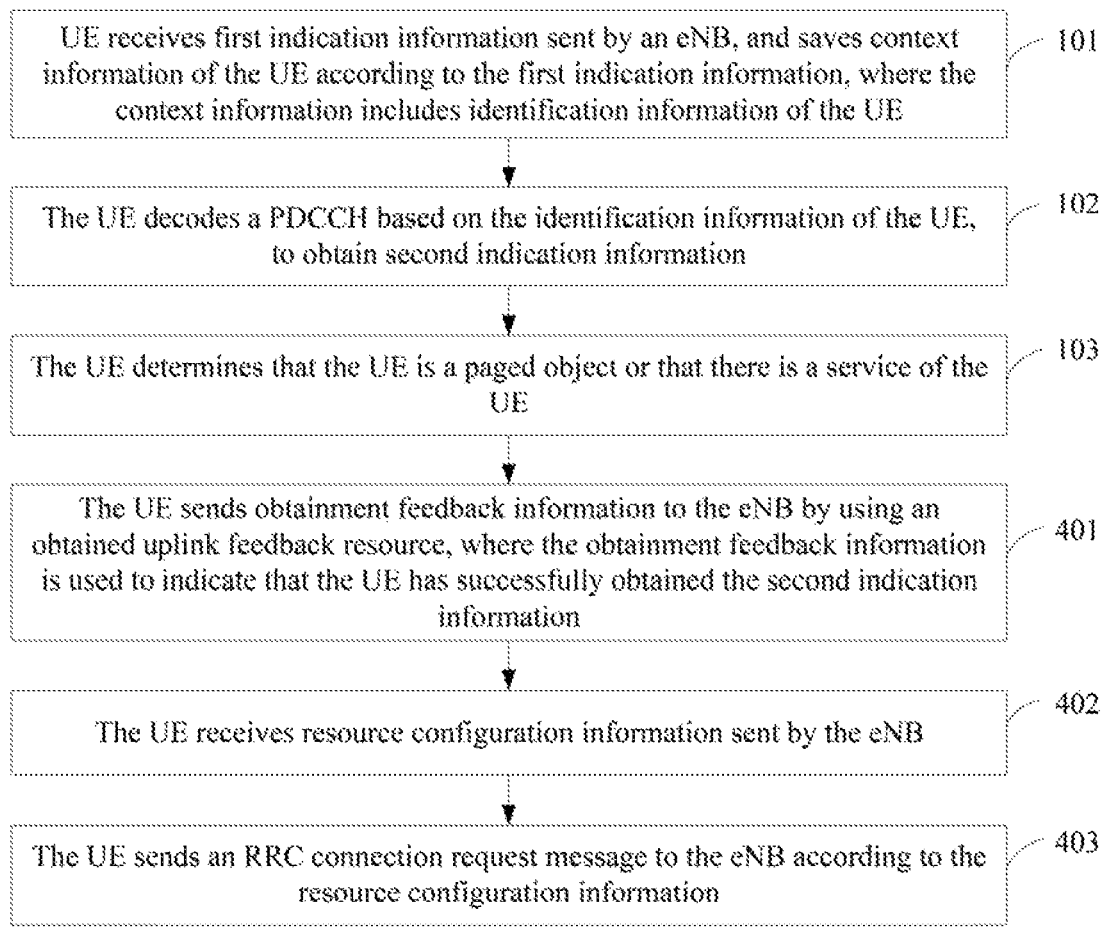
FIG. 4 is a flowchart of Embodiment 4 of a data transmission processing method according to an embodiment of the present disclosure.

FIG. 4 is a flowchart of Embodiment 4 of a data transmission processing method according to an embodiment of the present disclosure. As shown in FIG. 4, based on the foregoing embodiments, with the embodiment shown in FIG. 1 used as an example, after the UE decodes a PDCCH based on the identification information of the UE, to obtain second indication information, the method may further include the following steps:

Step 401. The UE sends obtainment feedback information to the eNB by using an obtained uplink feedback resource, where the obtainment feedback information is used to indicate that the UE has successfully obtained the second indication information.

Step 402. The UE receives resource configuration information sent by the eNB.

Step 403. The UE sends an RRC connection request message to the eNB according to the resource configuration information.

In this embodiment to resume data transmission, the UE usually resumes data transmission by using a process such as RRC connection establishment, RRC connection re-establishment, or RRC connection resumption. In this process, the UE may need to send the RRC connection request message to the eNB. Correspondingly, the RRC connection request message includes an RRC connection resumption request message, an RRC connection establishment request message, or an RRC connection re-establishment request message.

A corresponding resource may need to be used to send the RRC connection request message. Therefore, the eNB may need to allocate the resource to the UE, for the UE to send the RRC connection request message.

To avoid wasting of the resource allocated by the eNB, in this embodiment, the following feedback mechanism is provided:

Specifically, after the UE decodes the PDCCH by using the identification information of the UE, to obtain the second indication information indicating that the UE is the paged object or has a service, the UE sends the obtainment feedback information to the eNB by using the pre-obtained uplink feedback resource. The obtainment feedback information is used to indicate that the UE has successfully obtained the second indication information. After receiving the feedback information, the eNB allocates the resource to the UE, and sends the resource configuration information to the UE, so that the UE sends the RRC connection request message to the eNB according to the resource configuration information.

The uplink feedback resource includes an SR resource, or an uplink subframe determined by the eNB based on a PO corresponding to the UE.

For example, the eNB configures a resource in the $x^{th}$ uplink subframe subsequent to a given PO corresponding to the UE. This resource may be used to transfer a physical layer signal like a prior-art ACK/NACK feedback, or may feed back a higher layer message, to indicate whether the second indication information is successfully received.

In this embodiment, the uplink feedback resource is a UE specific resource. Because the eNB is able to learn which UEs are paged or may be paged at a given PO and the eNB has stored context information of these UEs, the eNB may allocate UE specific resources for the UEs paged at the PO. The UE specific resource is to ensure that the eNB can unambiguously recognize UE that sends a feedback, so as to unambiguously determine UE that detects indication information by listening.

According to a prior-art protocol, at a PO for given UE, the eNB does not necessarily send paging to the UE. A specific resource may be allocated only to UE to which the eNB actually sends paging. To reduce a quantity of feedbacks by the UE, the UE may send a feedback only after the UE successfully receives the paging for the UE, which is the second indication information, and if the paging is not received, send no feedback even if a network has sent the indication information for the UE and allocated a specific resource for the feedback of the UE.

The UE sends, depending on whether the second indication information is successfully obtained, a feedback on the configured uplink feedback resource. If the second indication information for the UE is successfully obtained, a success is fed back, or if the second indication information of the UE is not successfully obtained, a failure is fed back, or no feedback is provided.

The manner of allocating, by the eNB, a requested resource to the UE after receiving the obtainment feedback information is particularly applicable to a case in which the eNB has downlink data to send to the UE. For a case in which the UE has uplink data to send to the eNB, the following optional manner may be further included:

sending, by the UE, a resource request to the eNB by using an SR resource, where the SR resource includes obtainment feedback information that the second indication information is successfully obtained and/or indication information that there is uplink data that may need to be transmitted;

receiving, by the UE, resource configuration information sent by the eNB; and sending, by the UE, an RRC connection request message to the eNB according to the resource configuration information.

Different from using the SR resource to feed back, to the eNB, that the indication information is obtained, in this case, a periodic SR resource is configured for the UE. This SR resource is used to request a resource from the eNB, and the obtainment feedback information and indication information that there is uplink data that may need to be transmitted that are included in the SR resource may be understood as a notification to the eNB why the resource is requested.

In this embodiment, the UE decodes the PDCCH to obtain the second indication information, and sends the obtainment feedback information to the eNB when determining, based on the second indication information, that the UE is the paged object or has a service, to notify the eNB that the UE has successfully obtained the second indication information. This causes the eNB to allocate, to the UE, a resource used to send the RRC connection request message, so that data transmission resumption is more targeted, thereby avoiding wasting of the allocated resource.

In the embodiment shown in FIG. 3, a plurality of pieces of indication information are sent by using the PDCCH. This improves paging reliability and thereby avoids wasting of the resource allocated for use to send the RRC connection request message. In the embodiment shown in FIG. 4, an occasion for allocating the resource is controlled, so as to avoid wasting of the allocated resource. In the following, with reference to FIG. 5, another solution for avoiding wasting of a resource is provided in the sense of a specific allocation manner in which the resource is allocated.

Figure 5:
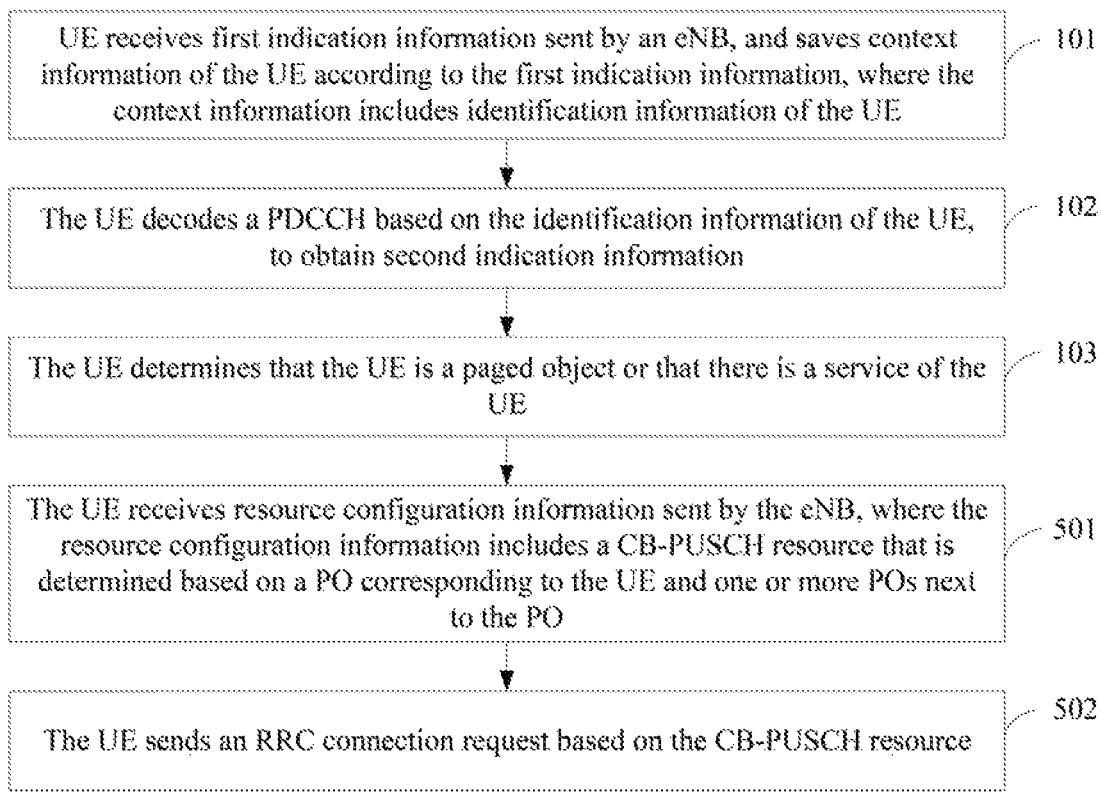
FIG. 5 is a flowchart of Embodiment 5 of a data transmission processing method according to an embodiment of the present disclosure.

FIG. 5 is a flowchart of Embodiment 5 of a data transmission processing method according to an embodiment of the present disclosure. As shown in FIG. 5, based on the embodiment shown in FIG. 1, alter step 103, the method may further include:

Step 501. The UE receives resource configuration information sent by the eNB, where the resource configuration information includes a CB-PUSCH resource that is determined based on a PO corresponding to the UE and one or more POs next to the PO.

Step 502. The UE sends an RRC connection request based on the CB-PUSCH resource.

In this embodiment, the RRC connection request message is based on the CB-PUSCH manner: A CB-PUSCH resource configuration and a sending resource for sending the second indication information used to indicate whether the UE is a paged object or has a service, are defined, for example, a relationship between paging occasions POs.

For example, the eNB defines X available CB-PUSCH resources between two consecutive POs, so as to ensure that the UE sends, through contention, the RRC connection request message for a maximum of X times before the eNB sends another piece of second indication information.

In this embodiment, a CB-PUSCH resource is allocated between the determined PO corresponding to the UE and at least one adjacent PO, so that the UE sends, through contention, the RRC connection request message only on the CB-PUSCH resource. This reduces wasting of CB-PUSCH resources.

Figure 6:
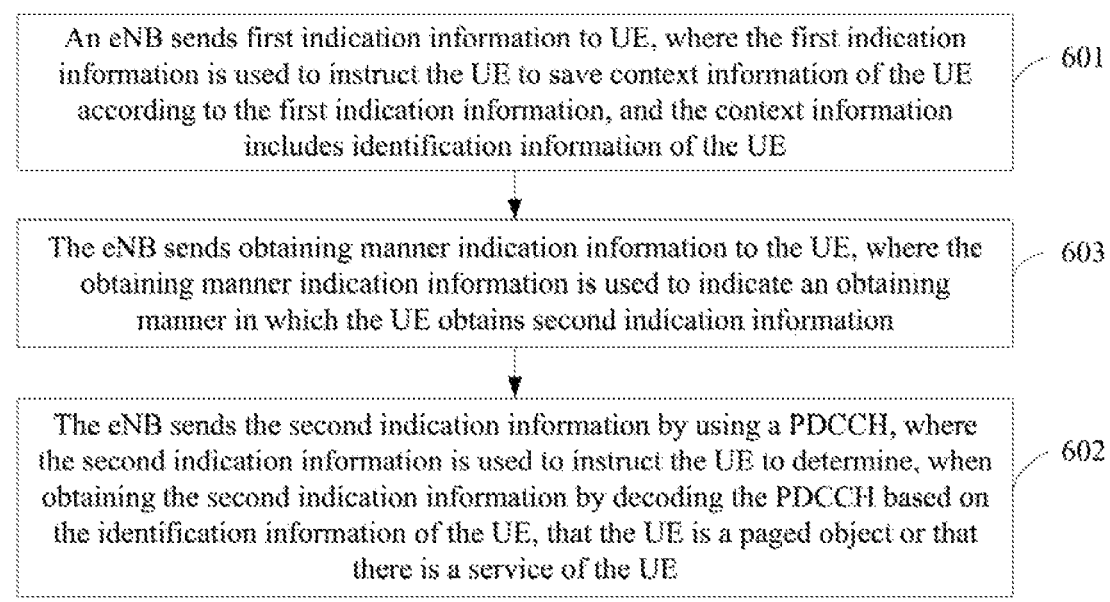
FIG. 6 is a flowchart of Embodiment 6 of a data transmission processing method according to an embodiment of the present disclosure.

FIG. 6 is a flowchart of Embodiment 6 of a data transmission processing method according to an embodiment of the present disclosure. This embodiment is executed by a base station (eNB). As shown in FIG. 6, the method includes the following steps.

Step 601. The eNB sends first indication information to UE, where the first indication information is used to instruct the UE to save context information of the UE according to the first indication information, and the context information includes identification information of the UE.

Step 602. The eNB sends second indication information by using a PDCCH, where the second indication information is used to instruct the UE to determine, when obtaining the second indication information by decoding the PDCCH based on the identification information of the UE, that the UE is a paged object or that there is a service of the UE.

Specifically, similar to the embodiment shown in FIG. 1, in this embodiment, the eNB may use the following manner to determine whether the UE has transmitted/received data within a preset time and send the first indication information when the UE has not transmitted/received data:

receiving a context information saving request sent by the UE, where the context information saving request is sent by the UE when the UE determines that there is no data that may need to be transmitted/received within the preset time; and determining, based on the context information saving request, that the UE has not transmitted/received data within the preset time, saving the context information of the UE, and sending the first indication information to the UE.

In addition, the eNB may alternatively send, based on a record of data transmission with the UE, the first indication information when determining that no data transmission with the UE is performed within the preset time.

Further, when the network has a service and may need to page the UE, an MME instructs the eNB to initiate paging to the UE. In this case, the eNB sends, to the UE by using the PDCCH, the second indication information used to indicate that the UE is the paged object or has a service.

Specifically, the sending the second indication information by the eNB may be: adding the second indication information to a preset DCI format, and sending the DCI format by using the PDCCH; or sending the second indication information by sending a preset DCI format by using the PDCCH. In addition, when the second indication information is sent by using the PDCCH, the second indication information is sent after the PDCCH is scrambled by using the identification information of the UE. The identification information of the UE may be, for example, a C-RNTI or a P-RNTI. Particularly, the identification information of the UE in this embodiment refers to an identifier that uniquely identifies the UE within a range of the eNB covering the UE or within a range of one or more cells of the eNB, for example, a C-RNTI.

After the eNB sends the second indication information by using the PDCCH, the UE decodes the PDCCH based on the identification information of the UE, so as to determine, based on the second indication information, that the UE is the paged object or has a service.

Optionally, the following manner may be used to decode the PDCCH based on the identification information of the UE to obtain the second indication information;

1. if a DCI format in the PDCCH is correctly decoded based on the identification information of the UE, determining that the second indication information is successfully obtained; or 2. decoding the PDCCH based on the identification information of the UE, to obtain the second indication information included in a DCI format in the PDCCH.

To be specific, in this embodiment, it may be defined that if the UE has correctly decoded the preset DCI format in the PDCCH by using the identification information of the UE, the UE is the paged object or has a service. In other words, the second indication information indicating that the UE is the paged object or has a service is obtained. Alternatively, a bit definition of second indication information may be added to the preset DCI format, and if the UE obtains, through decoding by using the identification information of the UE, the second indication information that is included in the DCI format in the PDCCH and that indicates that the UE is the paged object or has a service, the UE is the paged object or has a service.

In addition, in addition to the second indication information, the eNB may also include system information change indication information anchor emergency service indication information in the DCI format, so as to notify the UE that the system information has changed or to notify the UE of specific emergency service information.

Optionally, in this embodiment, to be compatible with a prior-art paging manner, in this embodiment, the eNB may further configure, for the UE, a manner of obtaining the second indication information. Specifically, the following step may be further included:

Step 603. The eNB sends obtaining manner indication information to the UE, where the obtaining manner indication information is used to indicate an obtaining manner in which the UE obtains the second indication information.

A timing relationship between step 603 and step 601 is not strictly limited.

The obtaining manner includes at least two of the following manners:

a first obtaining manner: correctly decoding a DCI format in the PDCCH based on the identification information that identifies the UE within a range of the eNB or within a range of one or more cells of the eNB, to obtain the second indication information;

a second obtaining manner: decoding the PDCCH based on the identification information that identifies the UE within a range of the eNB or within a range of one or more cells of the eNB, to obtain the second indication information included in the DCI format in the PDCCH; or a third obtaining manner: detecting the PDCCH based on a P-RNTI, to obtain the second indication information.

In the former two obtaining manners, the identification information of the UE mainly refers to a C-RNTI used to uniquely identify the UE. In the third obtaining manner, the P-RNTI does not uniquely identify the UE, and is common identification information.

For configuration of the obtaining manner, the eNB may configure a specific obtaining manner for the UE depending on a processing capability of the UE. For example, when the processing capability of the UE is relatively high, the third obtaining manner is configured. When the processing capability of the UE is low, the former two obtaining manners are configured.

When the obtaining manner indication information received indicates that the obtaining manner is the first obtaining manner or the second obtaining manner, the UE decodes the PDCCH based on the identification information of the UE, for example, a C-RNTI to obtain the second indication information. When the obtaining manner indication information indicates the third obtaining manner, the UE detects the PDCCH based on the P-RNTI, to obtain the second indication information. In this case, the second indication information is paging message scheduling information. Further, the UE receives, from a PDSCH and based on the scheduling information, a paging message corresponding to the UE, and determines, based on the paging message, that the UE is the paged object or that there is a service of the UE.

In this embodiment, when paging the UE, the eNB sends, by using the PDCCH, the second indication information indicating whether the UE is the paged object or has a service. In this way, after the UE decodes the PDCCH based on the identification information of the UE to obtain the second indication information, the UE can accurately determine whether the UE is the paged object or has a service; and if the UE determines that the UE is the paged object or has a service, the UE performs subsequent data transmission processing, or if the UE determines that the UE is not the paged object or does not have a service, the UE does not trigger subsequent processing. This avoids wasting of UE power consumption.

It should be noted that after the eNB sends the first indication information to the UE, the UE saves not only the context information, but also a security key for data transmission between the UE and the eNB and a data packet count for at least one radio bearer.

In this way, after determining, based on the second indication information, that the UE is the paged object or there is a service of the UE, the UE further determines a radio bearer that may need to be restored, and performs, by using the saved security key and a data packet count for the radio bearer that may need to be restored, data transmission meant for the radio bearer that may need to be restored. The security key includes an encryption key and/or an integrity protection key.

In other words, after determining that the UE is the paged object or there is a service of the UE, the UE triggers a data transmission resumption processing process, to receive downlink data of the service or send uplink data.

Figure 7:
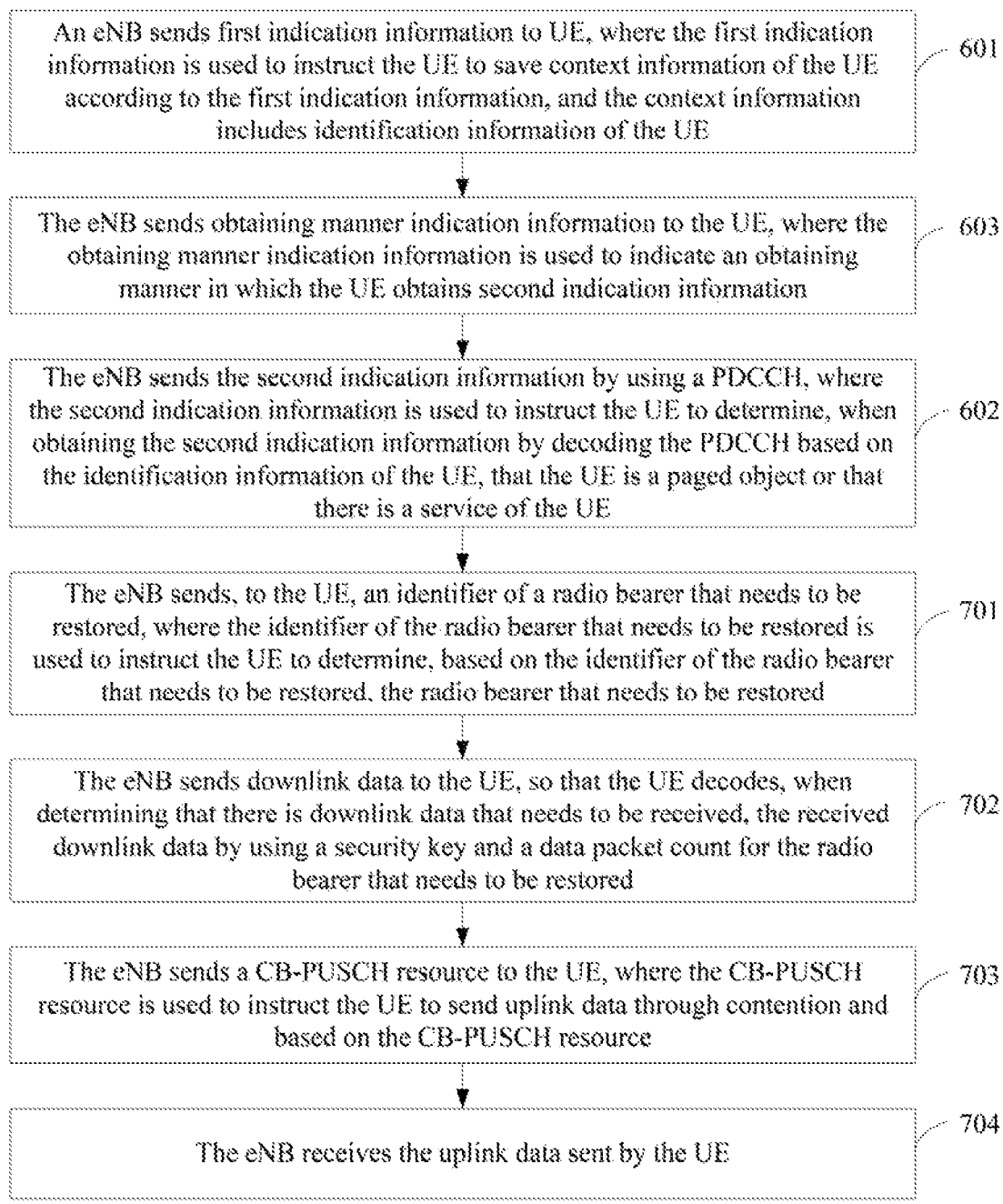
FIG. 7 is a flowchart of Embodiment 7 of a data transmission processing method according to an embodiment of the present disclosure.

To ensure that the UE is aware which radio bearer should be restored, the eNB further may need to perform the following processing process shown in FIG. 7.

FIG. 7 is a flowchart of Embodiment 7 of a data transmission processing method according to an embodiment of the present disclosure. This embodiment is executed by a base station (eNB). As shown in FIG. 7, based on the embodiment shown in FIG. 6, after step 602, the method may further include the following steps.

Step 701. The eNB sends, to UE, an identifier of a radio bearer that may need to he restored, where the identifier of the radio bearer that may need to be restored is used to instruct the UE to determine, based on the identifier of the radio bearer that may need to be restored, the radio bearer that may need to be restored.

The identifier of the radio bearer may be included in the second indication information, or may be included in a paging message.

For a case of sending downlink data to the UE, the eNB is aware of an identifier of a radio bearer corresponding to the downlink data, and sends the identifier of the radio bearer to the UE to notify the UE which radio bearer may need to be restored.

Further, for the case of sending downlink data to the UE, step 702 is performed. For a case of sending uplink data to the eNB by the UE, step 703 and step 704 are performed.

Step 702. The eNB sends downlink data to the UE, so that the UE decodes, when determining that there is downlink data that may need to be received, the received downlink data by using a security key and a data packet count for the radio bearer that may need to be restored.

Step 703. The eNB sends a CB-PUSCH resource to the UE, where the CB-PUSCH resource is used to instruct the UE to send uplink data through contention and based on the CB-PUSCH resource.

Step 704. The eNB receives the uplink data sent by the UE.

The uplink data is sent by the UE after the UE encrypts the uplink data by using an encryption keystream, and the UE generates the encryption keystream when determining that there is uplink data that may need to be sent, by using the security key and the data packet count for the radio bearer that may need to be restored.

In this embodiment, optionally; when the UE sends the uplink data, the UE is aware of a radio bearer corresponding to the uplink data, and restores the radio bearer. For sending of the uplink data, the CB-PUSCH resource pre-allocated by the eNB may be used to send the uplink data through contention based sending.

In the following, with reference to an embodiment shown in FIG. 8, a specific manner of sending the indication information by the eNB and a specific manner of sending downlink data by the eNB are described.

Figure 8:
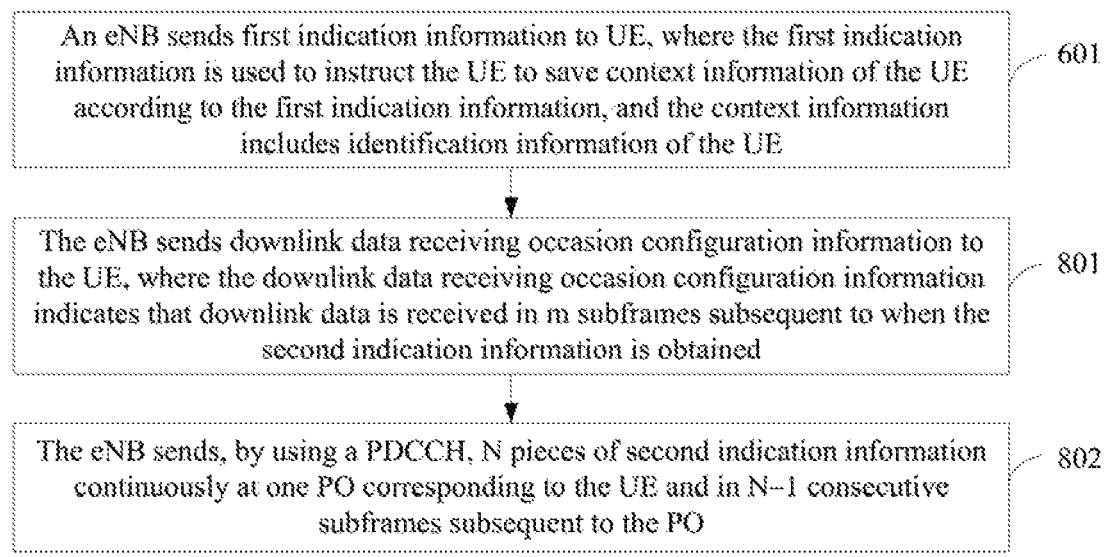
FIG. 8 is a flowchart of Embodiment 8 of a data transmission processing method according to an embodiment of the present disclosure.

FIG. 8 is a flowchart of Embodiment 8 of a data transmission processing method according to an embodiment of the present disclosure. This embodiment is executed by a base station (eNB). As shown in FIG. 8, based on the embodiment shown in FIG. 6, the sending the second indication information by using the PDCCH may be performed by using the following steps.

Step 801. The eNB sends downlink data receiving occasion configuration information to the UE, where the downlink data receiving occasion configuration information indicates that downlink data is received in m subframes subsequent to when the second indication information is obtained.

m is an integer greater than or equal to 0.

Step 802. The eNB sends, by using a PDCCH, N pieces of second indication information continuously at one PO corresponding to the UE and in N−1 consecutive subframes subsequent to the PO.

Alternatively, the eNB may send, by using the PDCCH, the second indication information at each of N different paging occasions POs corresponding to the UE.

In this embodiment, the solution of sending a plurality of pieces of the second indication information used to indicate whether the UE is a paged object or has a service is provided, to ensure paging reliability, to be specific, to ensure that the UE can determine more accurately whether the UE is the paged object or has a service, so that subsequent data transmission is triggered more accurately and reliably.

Specifically, after sending the N pieces of second indication information, the eNB may directly send the downlink data to the UE. The N pieces of second indication information may be sent continuously or discontinuously.

Specifically, in the continuous sending manner, the eNB calculates one PO corresponding to the UE and sends the N pieces of second indication information continuously at the PO and in the N−1 consecutive subframes subsequent to the PO. Specifically, the PDCCH is scrambled by using the identification information of the UE, to send a preset DCI format carrying the second indication information for N times or send a preset DCI format for N times, and the downlink data may be sent to the UE directly after the preset DCI format is sent for N times. Correspondingly, the UE decodes the PDCCH based on the identification information of the UE, and attempts to receive the downlink data after obtaining the N pieces of second indication information continuously sent by the eNB at the PO corresponding to the UE and in the N−1 consecutive subframes subsequent to the PO.

It should be noted that in this manner, an occasion for the eNB to send the downlink data may follow the m subframes subsequent to when the N pieces of second indication Information are sent continuously, and the eNB notifies the UE of the occasion for the eNB to send the downlink data, which is also the occasion for the UE to receive the downlink data. Correspondingly, the UE, receives the downlink data after the m subframes subsequent to when the N pieces of second indication information are obtained.

In the discontinuous sending manner, the eNB calculates N different POs corresponding to the UE, and sends the second indication information at each PO by using the PDCCH. Correspondingly, the UE attempts to receive the downlink data after decoding the PDCCH based on the identification information of the UE and obtaining any piece of second indication information among second indication information sent by the eNB at the N different POs corresponding to the UE, respectively. In this manner, because the UE is unaware which second indication information sent by the eNB is the second indication information obtained by the UE, the UE attempts to receive the downlink data immediately after obtaining the second indication information.

In this embodiment, a plurality of pieces of second indication information are sent, ensuring that the UE can receive paging from the eNB reliably. In this way, subsequent data transmission is more reliable, and wasting of a resource such as UE power consumption is avoided.

In the foregoing embodiments, ensuring that the UE receives paging from the eNB more reliably, and avoiding wasting of a resource such as UE power consumption, are considered from a perspective of sending the second indication information. In the following, with reference to an embodiment shown in FIG. 9, from a perspective of data transmission resumption, to be specific, from a perspective of allocating a resource for sending an RRC connection request message during data transmission resumption, the resource is allocated more accurately and reliably, so as to further avoid wasting of the resource for sending the RRC connection request message.

Figure 9:
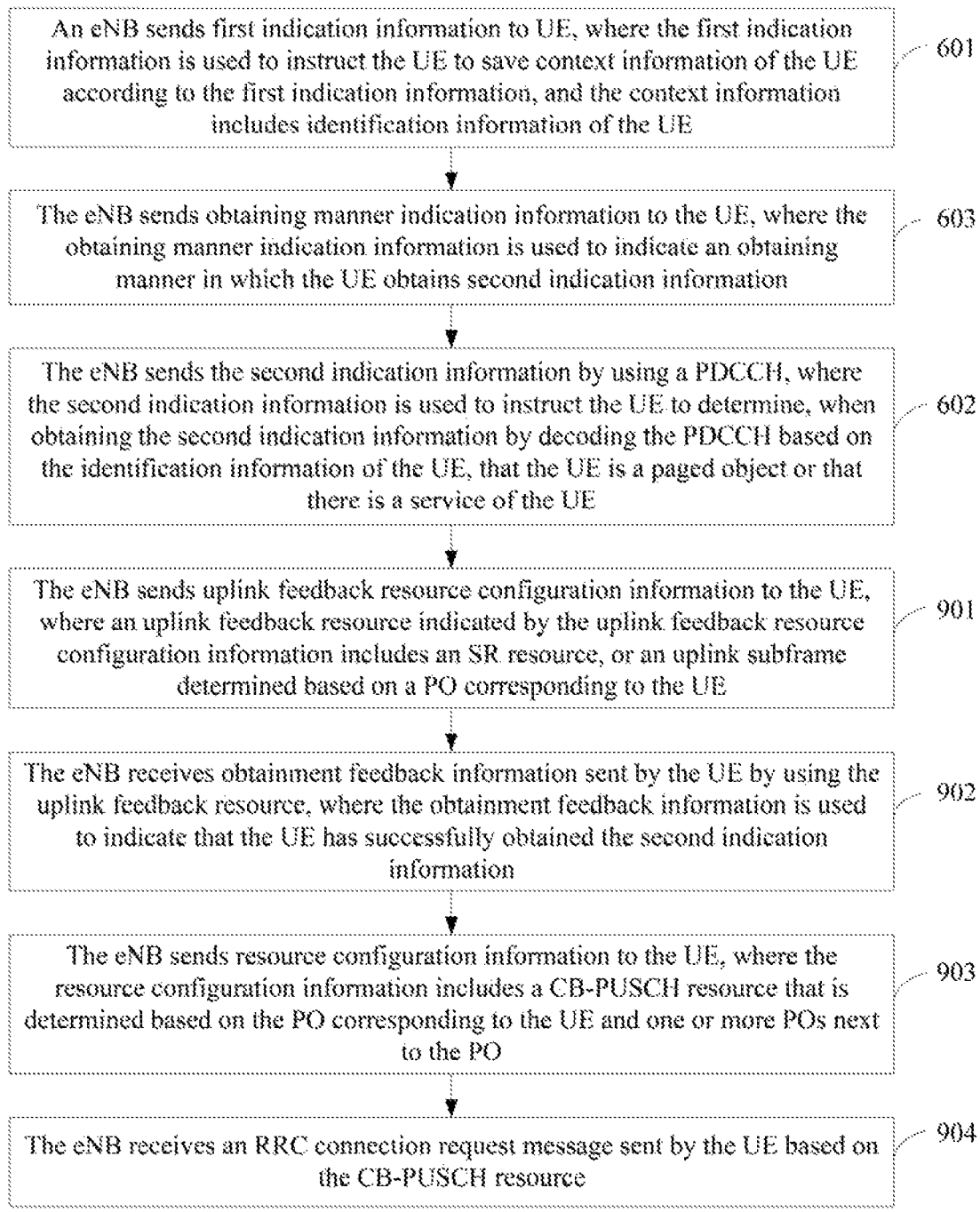
FIG. 9 is a flowchart of Embodiment 9 of a data transmission processing method according to an embodiment of the present disclosure.

FIG. 9 is a flowchart of Embodiment 9 of a data transmission processing method according to an embodiment of the present disclosure. As shown in FIG. 9, based on the embodiment shown in FIG. 6, after step 602, the following steps may be further included.

Step 901. The eNB sends uplink feedback resource configuration information to the UE, where an uplink feedback resource indicated by the uplink feedback resource configuration information includes an SR resource, or an uplink subframe determined based on a PO corresponding to the UE.

Step 902. The eNB receives obtainment feedback information sent by the UE by using the uplink feedback resource, where the obtainment feedback information is used to indicate that the UE has successfully obtained the second indication information.

In this embodiment, when the UE determines that the UE is a paged object or has a service, the UE may need to perform data transmission resumption processing, so as to perform data transmission processing such as uplink data sending and downlink data receiving.

Data transmission may be resumed by using a process such as RRC connection establishment, RRC connection re-establishment, or RRC connection resumption. In the process of implementing data transmission resumption by using these processes, an RRC connection request message may need to be sent to the eNB. Correspondingly, the RRC connection request message includes an RRC connection resumption request message, an RRC connection establishment request message, or an RRC connection re-establishment request message.

A corresponding resource may need to be used to send the RRC connection request message. Therefore, the eNB may need to allocate the resource to the UE, for the UE to send the RRC connection request message.

To avoid wasting of the resource allocated by the eNB, in this embodiment, the following feedback mechanism is provided:

Specifically, after the UE decodes the PDCCH by using the identification information of the UE, to obtain the second indication information indicating that the UE is the paged object or has a service, the UE sends the obtainment feedback information to the eNB by using the pre-obtained uplink feedback resource. The obtainment feedback information is used to indicate that the UE has successfully obtained the second indication information. After receiving the feedback information, the UE allocates the resource to the UE, and sends the resource configuration information to the UE, so that the UE sends the RRC connection request message to the eNB according to the resource configuration information.

The uplink feedback resource includes an SR resource, or an uplink subframe determined by the eNB based on the PO corresponding to the UE.

For example, the eNB configures a resource in the $x^{th}$ uplink subframe subsequent to a given PO corresponding to the UE. This resource may be used to transfer a physical layer signal like a prior-art ACK/NACK feedback, or may feed back a higher layer message, to indicate whether the second indication information is successfully received.

Step 903. The eNB sends resource configuration information to the UE, where the resource configuration information includes a CB-PUSCH resource that is determined based on the PO corresponding to the UE and one or more POs next to the PO.

Step 904. The eNB receives an RRC connection request message sent by the UE based on the CB-PUSCH resource.

In this embodiment, optionally, the requested resource allocated by the eNB to the UE is a resource used to send the RRC connection request message, and may include the CB-PUSCH resource that is determined based on the PO corresponding to the UE and the one or more POs next to the PO. In this case, the UE sends the RRC connection request message through contention by using the CB-PUSCH resource.

In this embodiment, the RRC connection request message is based on the CB-PUSCH manner: A CB-PUSCH resource configuration and a sending resource for sending the second indication information used to indicate whether the UE is a paged object or has a service, are defined, for example, a relationship between paging occasions POs.

For example, the eNB defines X available CB-PUSCH resources between two consecutive POs, so as to ensure that the UE sends, through contention, the RRC connection request message for a maximum of X times before the eNB sends another piece of second indication information.

This feedback mechanism is particularly applicable to a ease in which the eNB has downlink data that may need to be sent. For a case in which the UE has uplink data that may need to be sent, the UE may proactively request the eNB to allocate a resource when there is uplink data that may need to be sent to be used to send the RRC connection request message.

Specifically, for the uplink case, the following allocation processing process may be included:

receiving, by the eNB, a resource request sent by the UE by using an SR resource, where the SR resource includes obtainment feedback information that the second indication information is successfully obtained and/or indication information that there is uplink data that may need to be transmitted;

sending, by the eNB, resource configuration information to the UE; and receiving, by the eNB, an RRC connection request message sent by the UE according to the resource configuration information.

Different from using the SR resource to feed back, to the eNB, that the indication information is obtained, in this case, a periodic SR resource is configured for the UE. This SR resource is used to request a resource from the eNB, and the obtainment feedback information and indication information that there is uplink data that may need to be transmitted that are included in the SR resource may be understood as a notification to the eNB why the resource is requested.

In this embodiment, the UE decodes the PDCCH to obtain the second indication information, and sends the obtainment feedback information to the eNB when determining, based on the second indication information, that the UE is the paged object or has a service, to notify the eNB that the UE has successfully obtained the second indication information. This causes the eNB to allocate, to the UE, a resource used to send the RRC connection request message, so that data transmission resumption is more targeted, thereby avoiding wasting of the allocated resource.

Figure 10:
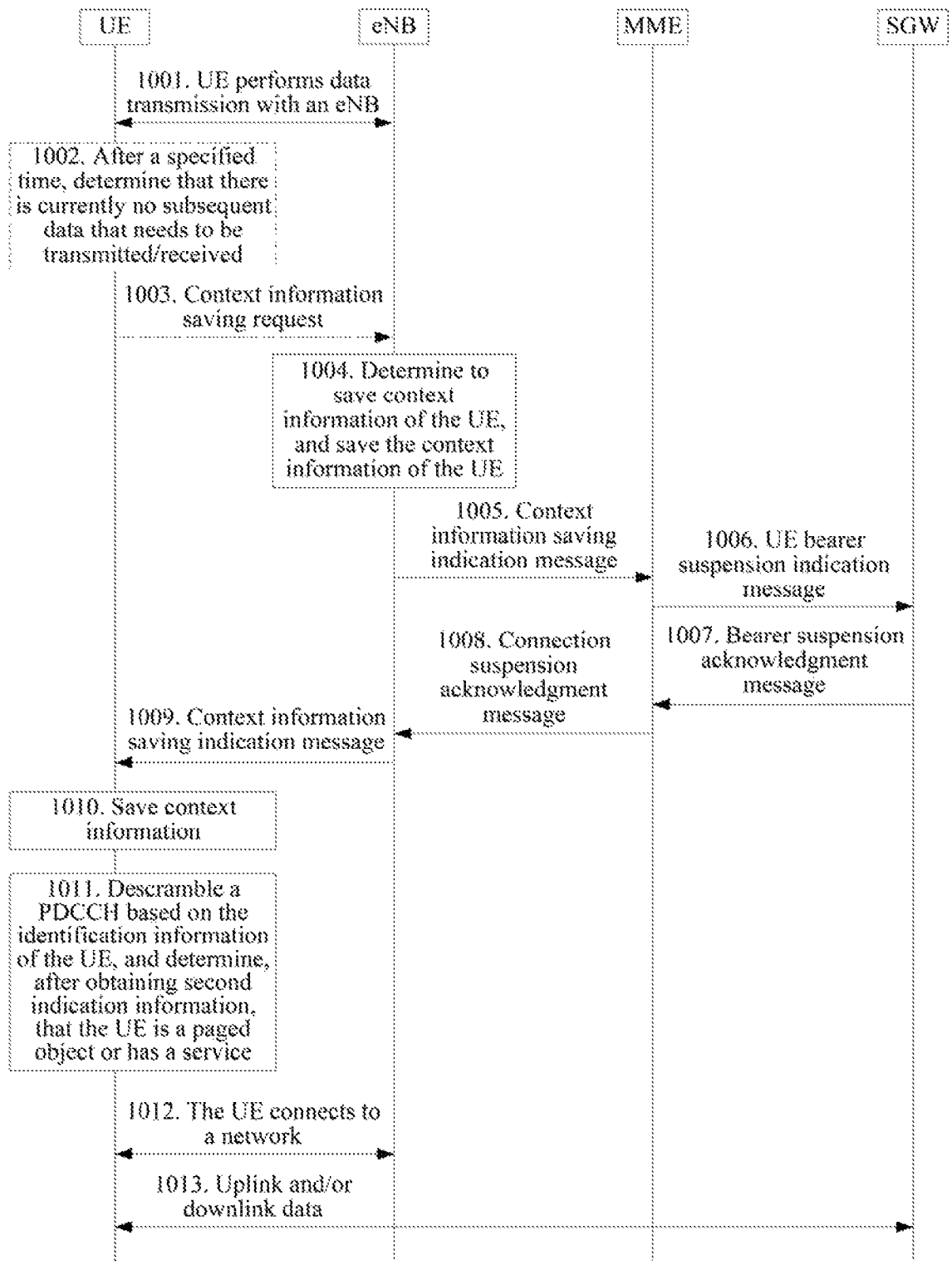
FIG. 10 is a flowchart of Embodiment 10 of a data transmission processing method according to an embodiment of the present disclosure.

FIG. 10 is a flowchart of Embodiment 10 of a data transmission processing method according to an embodiment of the present disclosure. As shown in FIG. 10, the following steps may be included.

Step 1001. UE performs data transmission with an eNB.

Step 1002. After a specified time, the UE determines that there is currently no subsequent data that may need to be transmitted/received.

Step 1003. The UE sends a am text information saving request to the eNB.

Alternatively, the context information saving request may be referred to as an RRC suspension request used to request to save context information of the UE.

Step 1002 and step 1003 are optional steps, and therefore, are marked using dashed lines in this figure.

Step 1004. The eNB determines to save context information of the UE, and saves the context information of the UE.

Alternatively, the context information saving request is equivalently referred to as RRC connection suspension. Specifically, the eNB may determine, when receiving the context information saving request sent by the UE, to save the context information of the UE. Alternatively, when determining, depending on a status of data transmission with the UE, that the UE has not transmitted/received data within a specified time, the eNB may automatically determine that saving the context information of the UE (or equivalently referred to as RRC connection suspension) may be performed.

Step 1005. The eNB sends a UE context information saving indication message to an MME.

Alternatively, the context information saving indication message is referred to as a context information saving request message, an RRC connection suspension request message, or an RRC connection suspension indication message, used to notify the MME that the UE is to be in a context information saved state or an RRC connection suspended state.

Step 1006. The MME sends a UE bearer suspension indication message to an SGW.

The indication message is used to indicate to the SGW that a bearer of the UE is to he in a suspended state or a data transmission suspended state.

After receiving the UE context information saving indication message sent by the eNB, the MME determines that the UE is to be in a context information saved state or an RRC connection suspended state. Then, the MME sends the indication message to the SGW, to indicate to the SGW that the UE is to be in a suspended state or a data transmission suspended state.

Step 1007. The SGW sends a hearer suspension acknowledgment message to the MME.

Step 1008. The MME sends a connection suspension acknowledgment message to the eNB.

Step 1009. The eNB sends a context information saving indication message to the UE.

Alternatively, the context information saving indication message is equivalently referred to as an RRC connection suspension indication message or an RRC connection release indication message. The context information saving indication message carries context information saving indication information, namely the first indication information, to command the UE, to save the context information of the UE.

Step 1010. The UE saves context information.

The context information includes identification information of the UE.

Step 1011. The UE decodes a PDCCH based on the identification information of the UE, and determines, after obtaining second indication information, that the UE is a paged object or has a service.

Step 1012. The UE interacts with the eNB to connect to a network.

Step 1013. The UE sends uplink data and/or receives downlink data.

Figure 11:
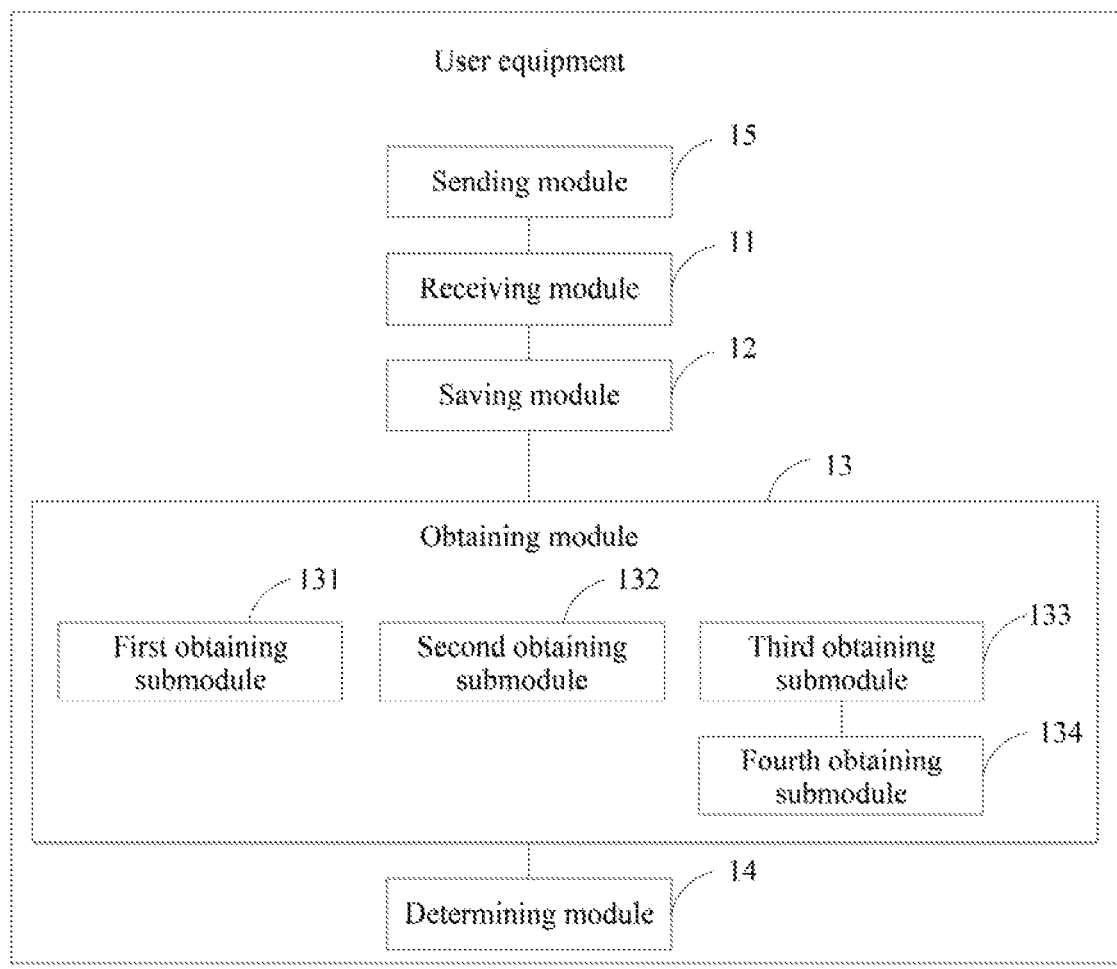
FIG. 11 is a schematic structural diagram of Embodiment 1 of user equipment according to an embodiment of the present disclosure.

FIG. 11 is a schematic structural diagram of Embodiment 1 of user equipment according to an embodiment of the present disclosure. As shown in FIG. 11, the user equipment includes a receiving module 11, a saving module 12, an obtaining module 13, and a determining module 14.

The receiving module 11 is configured to receive first indication information sent by a base station.

The saving module 12 is configured to save context information of the user equipment according to the first indication information. The context information includes identification information of the user equipment.

The obtaining module 13 is configured to decode a physical downlink control channel PDCCH based on the identification information of the user equipment, to obtain second indication information.

The determining module 14 is configured to: when the obtaining module obtains the second indication information, determine that the user equipment is a paged object or that there is a service of the user equipment.

Optionally, the user equipment further includes a sending module 15.

The sending module 15 is configured to send a context information saving request to the base station when it is determined that there is no data that may need to be transmitted/received within a preset time.

Correspondingly, the first indication information is sent by the base station based on the context information saving request.

Optionally, the receiving module 11 is further configured to receive obtaining manner indication information sent by the base station. The obtaining manner indication information is used to indicate an obtaining manner in which the user equipment obtains the second indication information.

The obtaining manner includes at least two of the following manners:

a first obtaining manner: correctly decoding the downlink control information DCI format in the PDCCH based on the identification information that identifies the user equipment within the range of the base station or within the range of the one or more cells of the base station, to obtain the second indication information;

a second obtaining manner: decoding the PDCCH based on the identification information that identifies the user equipment within the range of the base station or within the range of the one or more cells of the base station, to obtain the second indication information included in the DCI format in the PDCCH; and a third obtaining manner: detecting the PDCCH based on a P-RNTI, to obtain the second indication information.

Optionally, the obtaining module 13 includes a first obtaining submodule 131, or a second obtaining submodule 132, or a third obtaining submodule 133 and a fourth obtaining submodule 134.

The first obtaining submodule 131 is configured to: if a downlink control information DCI format in the PDCCH is correctly decoded based on the identification information that identifies the user equipment within a range of the base station or within a range of one or more cells of the base station, determine that the second indication information is successfully obtained.

The second obtaining submodule 132 is configured to decode the PDCCH based on the identification information that identifies the user equipment within a range of the base station or within a range of one or more cells of the base station, to obtain the second indication information included in the DCI format in the PDCCH.

The third obtaining submodule 133 is configured to detect the PDCCH based on a P-RNTI, to obtain the second indication information. The second indication information is paging message scheduling information.

The fourth obtaining submodule 134 is configured to receive, from a PDSCH and based on the scheduling information, a paging message corresponding to the user equipment.

The determining module 14 is further configured to determine, based on the paging message, that the user equipment is the paged object or that there is a service of the user equipment.

Specifically, the obtaining module 13 is specifically configured to:

search common search space CSS or user equipment specific search space USS, and decode the DCI format in the PDCCH by using the identification information of the user equipment, to obtain the second indication information.

Optionally, the DCI format further includes system information change indication information and/or emergency service indication information.

Various optional user equipments in the embodiment shown in FIG. 11 may be used to execute the technical solution in the embodiment shown in FIG. 1, with a similar implementation principle and a similar technical effect, and no details are repeated herein.

Figure 12:
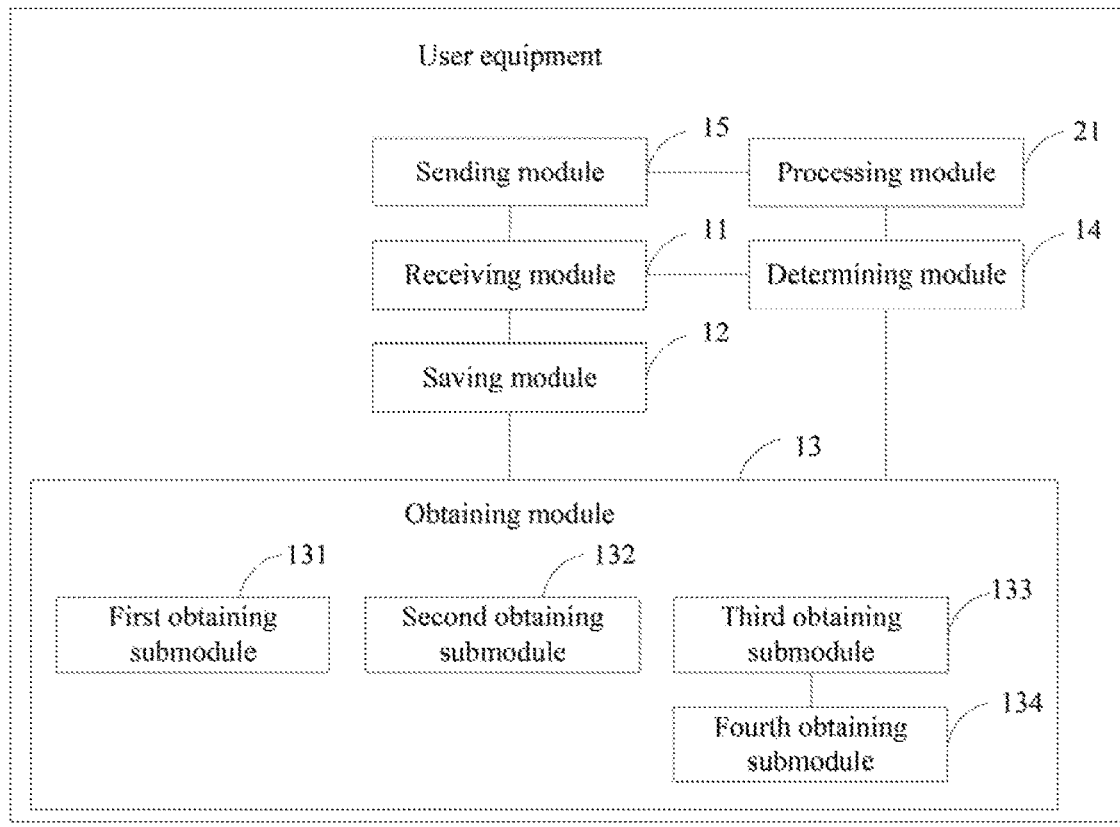
FIG. 12 is a schematic structural diagram of Embodiment 2 of user equipment according to an embodiment of the present disclosure.

FIG. 12 is a schematic structural diagram of Embodiment 2 of user equipment according to an embodiment of the present disclosure. As shown in FIG. 12, based on the embodiment shown in FIG. 11, the saving module 12 is further configured to:

save, according to the first indication information, a security key used for data transmission between the user equipment and the base station and a data packet count for at least one radio bearer, where the security key includes an encryption key and/or an integrity protection key;

The determining module 14 is further configured to determine a radio bearer that may need to be restored.

The user equipment further includes a processing module 21.

The processing module 21 is configured to perform, by using the security key and a data packet count for the radio bearer that may need to be restored, data transmission meant for the radio bearer that may need to be restored.

Optionally, the processing module 21 is configured to:

when it is determined that there is uplink data that may need to be sent, generate an encryption keystream by using the security key and the data packet count for the radio bearer that may need to be restored, and encrypt the uplink data by using the encryption keystream.

The sending module 15 is further configured to send the encrypted uplink data to the base station.

Optionally, the sending module 15 is further configured to: when it is determined that there is uplink data that may need to be sent, said the uplink data through contention and based on a contention based physical uplink shared channel CB-PUSCH resource pre-allocated by the base station.

Optionally, the processing module 21 is further configured to:

when it is determined that there is downlink data that may need to be received, decode the received downlink data by using the security key and the data packet count for the radio bearer that may need to be restored.

Optionally, the receiving module 11 is further configured to receive an identifier, sent by the base station, of the radio bearer that may need to be restored.

Correspondingly, the determining module 14 is further configured to determine, based on the identifier of the radio bearer that may need to be restored, the radio bearer that may need to be restored.

Optionally, the obtaining module 13 is further configured to:

decode the PDCCH based on the identification information of the user equipment, to obtain any piece of second indication information among second indication information sent by the base station at N different paging occasions POs corresponding to the user equipment, respectively; or decode the PDCCH based on the identification information of the user equipment, to obtain N pieces of second indication information continuously sent by the base station at one PO corresponding to the user equipment and in N−1 consecutive subframes subsequent to the PO.

Optionally, the receiving module 11 is further configured to:

receive downlink data receiving occasion configuration information sent by the base station, where the downlink data receiving occasion configuration information indicates that the downlink data is received in m subframes subsequent to when the second indication information is obtained, and m is an integer greater than or equal to 0; and receive the downlink data according to the downlink data receiving occasion configuration information.

Optionally, the sending module 15 is further configured to:

send obtainment feedback information to the base station by using an obtained uplink feedback resource, where the obtainment feedback information is used to indicate that the user equipment has successfully obtained the second indication information.

The uplink feedback resource includes a scheduling request SR resource, or an uplink subframe determined by the base station based on the PO corresponding to the user equipment.

Optionally, the sending module 15 is further configured to send an RRC connection request message to the base station, where the RRC connection request message includes an RRC connection resumption request message, an RRC connection establishment request message, or an RRC connection re-establishment request message.

Optionally, the receiving module 11 is further configured to receive resource configuration information sent by the base station. The resource configuration information includes a CB-PUSCH resource that is determined based on the PO corresponding to the user equipment and one or more POs next to the PO.

The sending module 15 is further configured to send the RRC connection request based on the CB-PUSCH resource.

Optionally, the sending module 15 is further configured to send a resource request to the base station by using an SR resource.

The receiving module 11 is further configured to receive resource configuration information sent by the base station.

The sending module 15 is further configured to send the RRC connection request message to the base station according to the resource configuration information.

The SR resource includes obtainment feedback information that the second indication information is successfully obtained and/or indication information that there is uplink data that may need to be transmitted.

The user equipment provided in this embodiment is configured to execute the technical solution of the user equipment in the foregoing embodiments shown in FIG. 2 to FIG. 5, with a similar implementation principle and a similar technical effect, and no details are repeated herein.

Figure 13:
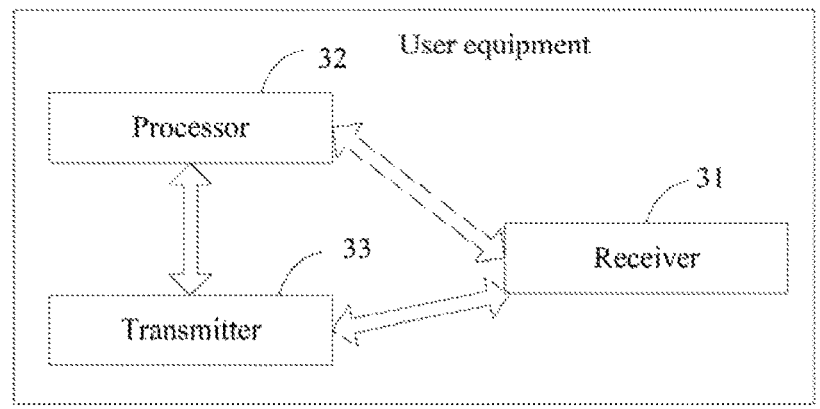
FIG. 13 is a schematic structural diagram of Embodiment 3 of user equipment according to an embodiment of the present disclosure.

FIG. 13 is a schematic structural diagram of Embodiment 3 of user equipment according to an embodiment of the present disclosure. As shown in FIG. 13, the user equipment includes a receiver 31, a processor 32, and a transmitter 33.

The receiver 31 is configured to receive first indication information sent by a base station.

The processor 32 is configured to save context information of the user equipment according to the first indication information. The context information includes identification information of the user equipment.

The processor 32 is further configured to: decode a physical downlink control channel PDCCH based on the identification information of the user equipment, to obtain second indication information; and determine that the user equipment is a paged object or that there is a service of the user equipment.

Optionally, the processor 32 is further configured to: if a downlink control information DCI format in the PDCCH is correctly decoded based on the identification information that identifies the user equipment within a range of the base station or within a range of one or more cells of the base station, determine that the second indication information is successfully obtained.

Optionally, the processor 32 is further configured to decode the PDCCH based on the identification information that identifies the user equipment within a range of the base station or within a range of one or more cells of the base station, to obtain the second indication information included in the DCI format in the PDCCH.

Optionally, the receiver 31 is further configured to receive obtaining manner indication information scat by the base station. The obtaining manner indication information is used to indicate an obtaining manner in which the user equipment obtains the second indication information.

The obtaining manner includes at least two of the following manners:

a first obtaining manner: correctly decoding the downlink control information DCI format in the PDCCH based on the identification information that identifies the user equipment within the range of the base station or within the range of the one or more cells of the base station, to obtain the second indication information;

a second obtaining manner: decoding the PDCCH based on the identification information that identifies the user equipment within the range of the base station or within the range of the one or more cells of the base station, to obtain the second indication information included in the DCI format in the PDCCH; and a third obtaining manner: detecting the PDCCH based on a P-RNTI, to obtain the second indication information.

Optionally, the processor 32 is further configured to: detect the PDCCH basal on a P-RNTI, to obtain the second indication information, where the second indication information is paging message scheduling information; receive, from a PDSCH and based on the scheduling information, a paging message corresponding to the user equipment; and determine, based on the paging message, that the user equipment is the paged object or that there is a service of the user equipment.

Optionally, the processor 32 is further configured to: search common search space CSS or user equipment specific search space USS, and decode the DCI formal in the PDCCH by using the identification information of the user equipment, to obtain the second indication information.

The DCI format further includes system information change indication information and/or emergency service indication information.

The transmitter 33 is configured to send a context information saving request to the base station when it is determined that there is no data that may need to be transmitted/received within a preset time.

The first indication information is sent by the base station based on the context information saving request.

Optionally, the processor 32 is further configured to save, according to the first indication information, a security key used for data transmission between the user equipment and the base station and a data packet count for at least one radio bearer. The security key includes an encryption key and/or an integrity protection key.

The processor 32 is further configured to determine a radio bearer that may need to be restored.

The processor 32 is further configured to perform, by using the security key and a data packet count for the radio bearer that may need to be restored, data transmission meant for the radio bearer that may need to be restored.

Optionally, the processor 32 is further configured to:

when it is determined that there is uplink data that may need to be sent, generate an encryption keystream by using the security key and the data packet count for the radio bearer that may need to be restored, and encrypt the uplink data by using the encryption keystream.

The transmitter 33 is further configured to send the encrypted uplink data to the base station.

Optionally, the transmitter 33 is further configured to: when it is determined that there is uplink data that may need to be sent, send the uplink data through contention and based on a contention based physical uplink shared channel CB-PUSCH resource pre-allocated by the base station.

Optionally the processor 32 is further configured to:

when it is determined that there is downlink data that may need to be received, decode the received downlink data by using the security key and the data packet count for the radio bearer that may need to be restored.

Optionally, the receiver 31 is further configured to receive an identifier, sent by the base station, of the radio bearer that may need to be restored.

The processor 32 is further configured to determine, based on the identifier of the radio bearer that may need to be restored, the radio bearer that may need to be restored.

Optionally, the processor 32 is further configured to:

decode the PDCCH based on the identification information of the user equipment, to obtain any piece of second indication information among second indication information sent by the base station at N different paging occasions POs corresponding to the user equipment, respectively; or decode the PDCCH based on the identification information of the user equipment, to obtain N pieces of second indication information continuously sent by the base station at one PO corresponding to the user equipment and in N−1 consecutive subframes subsequent to the PO.

Optionally, the receiver 31 is further configured to:

receive downlink data receiving occasion configuration information sent by the base station, where the downlink data receiving occasion configuration information indicates that the downlink data is received in m subframes subsequent to when the second indication information is obtained, and m is an integer greater than or equal to 0; and receive the downlink data according to the downlink data receiving occasion configuration information.

Optionally, the transmitter 33 is further configured to:

send obtainment feedback information to the base station by using an obtained uplink feedback resource, where the obtainment feedback information is used to indicate that the user equipment has successfully obtained the second indication information.

The uplink feedback resource includes a scheduling request SR resource, or an uplink subframe determined by the base station based on the PO corresponding to the user equipment.

Optionally, the transmitter 33 is further configured to:

send an RRC connection request message to the base station, where the RRC connection request message includes an RRC connection resumption request message, an RRC connection establishment request message, or an RRC connection re-establishment request message.

Optionally, the receiver 31 is further configured to:

receive resource configuration information sent by the base station, where the resource configuration information includes a CB-PUSCH resource that is determined based on the PO corresponding to the user equipment and one or more POs next to the PO.

The transmitter 33 is further configured to:

send the RRC connection request based on the CB-PUSCH resource.

Optionally, the transmitter 33 is further configured to send a resource request to the base station by using an SR resource.

The receiver 31 is further configured to receive resource configuration information sent by the base station.

The transmitter 33 is further configured to send the RRC connection request message to the base station according to the resource configuration information.

The SR resource includes obtainment feedback information that the second indication information is successfully obtained and/or indication information that there is uplink data that may need to be transmitted.

The user equipment provided in this embodiment is configured to execute the technical solution of the user equipment in the foregoing embodiments shown in FIG. 1 to FIG. 5, with a similar implementation principle and a similar technical effect, and no details are repeated herein.

Figure 14:
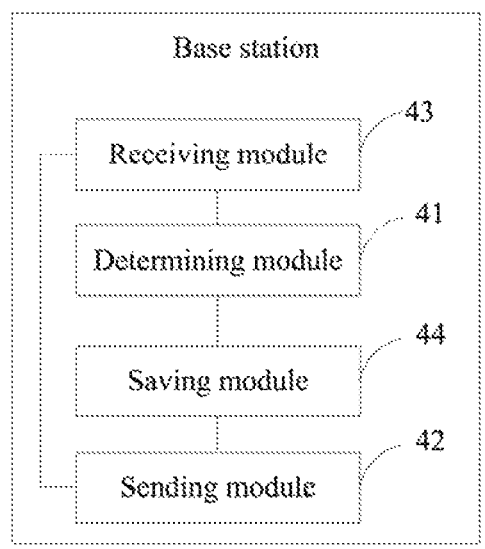
FIG. 14 is a schematic structural diagram of Embodiment 1 of a base station according to an embodiment of the present disclosure.

FIG. 14 is a schematic structural diagram of Embodiment 1 of a base station according to an embodiment of the present disclosure. As shown in FIG. 14, the base station includes a determining module 41 and a sending module 42.

The determining module 41 is configured to determine whether user equipment has transmitted/received data within a preset time.

The sending module 42 is configured to send first indication information to the user equipment when the user equipment has not transmitted/received data within the preset time. The first indication information is used to instruct the user equipment to save context information of the user equipment according to the first indication information, and the context information includes identification information of the user equipment.

The sending module 42 is further configured to: send second indication information by using a PDCCH, where the second indication information is used to instruct the user equipment to determine, when obtaining the second indication information by decoding the PDCCH based on the identification information of the user equipment, that the user equipment is a paged object or that there is a service of the user equipment.

Optionally, the indication information includes a downlink control information DCI format in the PDCCH, or the second indication information is carried in a DCI format.

The identification information of the user equipment is used to identify the user equipment within a range of the base station covering the user equipment or within a range of one or more cells of the base station.

Optionally, the sending module 42 is further configured to:

send obtaining manner indication information to the user equipment, where the obtaining manner indication information is used to indicate an obtaining manner in which the user equipment obtains the second indication information.

The obtaining manner includes at least two of the following manners:

a first obtaining manner: correctly decoding the downlink control information DCI format in the PDCCH based on the identification information that identifies the user equipment within the range of the base station or within the range of the one or more cells of the base station, to obtain the second indication information;

a second obtaining manner: decoding the PDCCH based on the identification information that identifies the user equipment within the range of the base station or within the range of the one or more cells of the base station, to obtain the second indication information included in the DCI format in the PDCCH; and a third obtaining manner: detecting the PDCCH based on a P-RNTI, to obtain the second indication information.

The DCI format further includes system information change indication information and/or emergency service indication information.

Further, optionally, the base station further includes a receiving module 43 and a saving module 44.

The receiving module 43 is configured to receive a context information saving request sent by the user equipment. The context information saving request is sent by the user equipment when the user equipment determines that there is no data that may need to be transmitted/received within a preset time.

The determining module 41 is specifically configured to determine, based on the context information saving request, dial the user equipment has not transmitted/received data within the preset time.

The saving module 44 is configured to save the context information.

Alternatively, the determining module 41 triggers the saving module 44 to save the context information when determining that the user equipment has no data that may need to be transmitted/received within the preset time, and triggers the sending module 42 to send the first indication information to the user equipment.

Optionally, the first indication information is used to instruct the user equipment to save a security key used for data transmission between the user equipment and the base station and a data packet count for at least one radio bearer; after it is determined that the user equipment is the paged object or that there is a service of the user equipment, a radio bearer that may need to be restored is determined; and data transmission meant for the radio bearer that may need to be restored is performed by using the security key and a data packet count for the radio bearer that may need to be restored. The security key includes an encryption key and/or an integrity protection key.

Optionally, the receiving module 43 is further configured to:

receive uplink data sent by the user equipment, where the uplink data is sent by the user equipment after the user equipment encrypts the uplink data by using an encryption keystream, and the user equipment generates the encryption keystream when determining that there is uplink data that may need to be sent, by using the security key and the data packet count for the radio bearer that may need to be restored.

Optionally, the sending module 42 is further configured to:

send a contention based physical uplink shared channel CB-PUSCH resource to the user equipment, where the CB-PUSCH resource is used to instruct the user equipment to send the uplink data through contention and based on the CB-PUSCH resource.

Optionally, the sending module 42 is further configured to:

send downlink data to the user equipment, so that the user equipment decodes, when determining that there is downlink data that may need to be received, the received downlink data by using the security key and the data packet count for the radio bearer that may need to be restored.

Optionally, the sending module 42 is further configured to:

send, to the user equipment, an identifier of the radio bearer that may need to be restored, where the identifier of the radio bearer that may need to be restored is used to instruct the user equipment to determine, based on the identifier of the radio bearer that may need to be restored, the radio bearer that may need to be restored.

Optionally, the sending module 42 is further configured to:

send the second indication information by using the PDCCH at each of N different paging occasions POs corresponding to the user equipment; or continuously send, by using the PDCCH, N pieces of second indication information at one PO corresponding to the user equipment and in N−1 consecutive subframes subsequent to the PO.

Optionally, the sending module 42 is further configured to:

send downlink data receiving occasion configuration information to the user equipment, where the downlink data receiving occasion configuration information indicates that the downlink data is received in m subframes subsequent to when the second indication information is obtained, and m is an integer greater than or equal to 0.

Optionally, the receiving module 43 is further configured to:

receive obtainment feedback information sent by the user equipment by using an uplink feedback resource, where the obtainment feedback information is used to indicate that the user equipment has successfully obtained the second indication information.

Optionally, the sending module 42 is further configured to:

send uplink feedback resource configuration information to the user equipment, where an uplink feedback resource indicated by the uplink feedback resource configuration information includes a scheduling request SR resource, or an uplink subframe determined based on the PO corresponding to the user equipment.

Optionally, the receiving module 43 is further configured to:

receive an RRC connection request message sent by the user equipment, where the RRC connection request message includes an RRC connection resumption request message, an RRC connection establishment request message, or an RRC connection re-establishment request message.

Optionally, the sending module 42 is further configured to:

send resource configuration information to the user equipment, where the resource configuration information includes a CB-PUSCH resource that is determined based on the PO corresponding to the user equipment and one or more POs next to the PO.

The receiving module 43 is further configured to:

receive an RRC connection request message sent by the user equipment based on the CB-PUSCH resource.

Optionally, the receiving module 43 is further configured to receive a resource request sent by the user equipment by using an SR resource.

The sending module 42 is further configured to send resource configuration information to the user equipment.

The receiving module 43 is further configured to receive the RRC connection request message sent by the user equipment according to the resource configuration information.

The SR resource includes obtainment feedback information that the second indication information is successfully obtained and/or indication information that there is uplink data that may need to be transmitted.

The base station provided in this embodiment is configured to execute the technical solution of the base station in the embodiments shown in FIG. 6 to FIG. 10, with a similar implementation principle and a similar technical effect, and no details are repeated herein.

Figure 15:
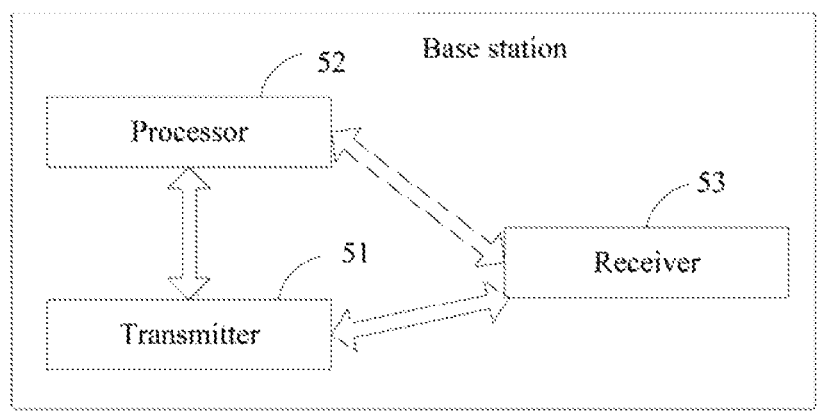
FIG. 15 is a schematic structural diagram of Embodiment 2 of a base station according to an embodiment of the present disclosure.

FIG. 15 is a schematic structural diagram of Embodiment 2 of a base station according to an embodiment of the present disclosure. As shown in FIG. 15, the base station includes a transmitter 51, a processor 52, and a receiver 53.

The transmitter 51 is configured to send first indication information to user equipment. The first indication information is used to instruct the user equipment to save context information of the user equipment according to the first indication information, and the context information includes identification information of the user equipment.

The transmitter 51 is further configured to: send second indication information by using a PDCCH, where the second indication information is used to instruct the user equipment to determine, when obtaining the second indication information by decoding the PDCCH based on the identification information of the user equipment, that the user equipment is a paged object or that there is a service of the user equipment.

Optionally, the indication information includes a downlink control information DCI format in the PDCCH, or the second indication information is carried in a DCI format.

The identification information of the user equipment is used to identify the user equipment within a range of the base station covering the user equipment or within a range of one or more cells of the base station.

Optionally, the transmitter 51 is further configured to:

send obtaining manner indication information to the user equipment, where the obtaining manner indication information is used to indicate an obtaining manner in which the user equipment obtains the second indication information.

The obtaining manner includes at least two of the following manners:

a first obtaining manner: correctly decoding the downlink control information DCI format in the PDCCH based on the identification information that identifies the user equipment within the range of the base station or within the range of the one or more cells of the base station, to obtain the second indication information;

a second obtaining manner: decoding the PDCCH based on the identification information that identifies the user equipment within the range of the base station or within the range of the one or more cells of the base station, to obtain the second indication information included in the DCI format in the PDCCH; and a third obtaining manner: detecting the PDCCH based on a P-RNTI, to obtain the second indication information.

The DCI format further includes system information change indication information and/or emergency service indication information.

The receiver 53 is configured to receive a context information saving request sent by the user equipment. The context information saving request is sent by the user equipment when the user equipment determines that there is no data that may need to be transmitted/received within a preset time.

The processor 52 is further configured to: determine, based on the context information saving request, that the user equipment has not transmitted/received data within the preset time; and save the context information.

Alternatively, the processor 52 is further configured to save the context information when determining that the user equipment has no data that may need to be transmitted/received within the preset time.

Optionally, the first indication information is used to instruct the user equipment to save a security key used for data transmission between the user equipment and the base station and a data packet count for at least one radio bearer; after it is determined that the user equipment is the paged object or that there is a service of the user equipment, a radio bearer that may need to be restored is determined: and data transmission meant tor the radio bearer that may need to be restored is performed by using the security key and a data packet count for the radio hearer that may need to be restored. The security key includes an encryption key and/or an integrity protection key.

Optionally, the receiver 53 is further configured to:
receive uplink data sent by the user equipment, where the uplink data is sent by the user equipment alter the user equipment encrypts the uplink data by using an encryption keystream, and the user equipment generates the encryption keystream when determining that there is uplink data that may need to he sent, by using the security key and the data packet count for the radio bearer that may need to be restored.

Optionally, the transmitter 51 is further configured to:
send a contention based physical uplink shared channel CB-PUSCH resource to the user equipment, where the CB-PUSCH resource is used to instruct the user equipment to send the uplink data through contention and based on the CB-PUSCH resource.

Optionally, the transmitter 51 is further configured to:
send downlink data to the user equipment, so that the user equipment decodes, when determining that there is downlink data that may need to be received, the received downlink data by using the security key and the data packet count for the radio bearer that may need to be restored.

Optionally, the transmitter 51 is further configured to:
send, to the user equipment, an identifier of the radio bearer that may need to be restored, where the identifier of the radio bearer that may need to be restored is used to instruct the user equipment to determine, based on the identifier of the radio bearer that may need to be restored, the radio bearer that may need to be restored.

Optionally, the transmitter 51 is further configured to:
send the second indication information by using the PDCCH at each of N different paging occasions POs corresponding to the user equipment; or
continuously send, by using the PDCCH, N pieces of second indication information at one PO corresponding to the user equipment and in N−1 consecutive subframes subsequent to the PO.

Optionally, the transmitter 51 is further configured to:
send downlink data receiving occasion configuration information to the user equipment, where the downlink data receiving occasion configuration information indicates that the downlink data is received in m subframes subsequent to when the second indication information is obtained, and m is an integer greater than or equal to 0.

Optionally, the receiver 53 is further configured to:
receive obtainment feedback information sent by the user equipment by using an uplink feedback resource, where the obtainment feedback information is used to indicate that the user equipment has successfully obtained the second indication information.

Optionally, the transmitter 51 is further configured to:
send uplink feedback resource configuration information to the user equipment, where an uplink feedback resource indicated by the uplink feedback resource configuration information includes a scheduling request SR resource, or an uplink subframe determined based on the PO corresponding to the user equipment.

Optionally, the receiver 53 is further configured to:
receive an RRC connection request message sent by the user equipment, where the RRC connection request message includes an RRC connection resumption request message, an RRC connection establishment request message, or an RRC connection re-establishment request message.

Optionally, tire transmitter 51 is further configured to:
send resource configuration information to the user equipment, where the resource configuration information includes a CB-PUSCH resource that is determined based on the PO corresponding to the user equipment and one or more POs next to the PO.

The receiver 53 is further configured to:
receive an RRC connection request message sent by the user equipment based on the CB-PUSCH resource.

Optionally, the receiver 53 is further configured to receive a resource request sent by the user equipment by using an SR resource.

The transmitter 51 is further configured to send resource configuration information to the user equipment.

The receiver 53 is further configured to receive the RRC connection request message sent by the user equipment according to the resource configuration information.

The SR resource includes obtainment feedback information that the second indication information is successfully obtained and or indication information that there is uplink data that may need to be transmitted.

The base station provided in this embodiment is configured to execute the technical solution of the base station in tire embodiments shown in FIG. 6 to FIG. 10, with a similar implementation principle and a similar technical effect, and no details are repeated herein.

It should be understood that in the foregoing user equipment and base station embodiments, the processor may be a central processing unit (CPU), or may be another general-purpose processor, a digital signal processor (DSP), an application-specific integrated circuit (ASIC), or the like. The general purpose processor may be a microprocessor, or the processor may be any normal processor, or the like. The steps of the method disclosed with reference to the embodiments of the present disclosure may be directly performed by a hardware processor, or may be performed by using a combination of hardware in the processor and a software module.

Persons of ordinary skill in the art may understand that all or some of the steps of the me food embodiments may be implemented by a program instructing relevant hardware. The program may be stored in a computer-readable storage medium. When the program is executed, the steps of the methods in the embodiments are performed. The storage medium includes: a read-only memory (ROM), a RAM, a flash memory, a hard disk, a solid state disk, a magnetic tape (English: magnetic tape), a floppy disk, an optical disc, and any combination thereof.

Finally, it should be noted that the foregoing embodiments arc merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. User equipment, comprising:
a receiver, configured to receive first indication information from a base station; and
a processor, configured to:
save context information of the user equipment according to the first indication information, wherein the context information comprises identification information of the user equipment;
decode a physical downlink control channel (PDCCH) based on the identification information of the user equipment, to obtain second indication information; and
determine that the user equipment is a paged object or that there is a service of the user equipment according to the second indication information;
save, according to the first indication information, a security key used for data transmission between the user equipment and the base station and a data packet count for at least one radio bearer, wherein the security key comprises an encryption key and/or an integrity protection key and the data packet count is compliant with the Packet Data Convergence Protocol (PDCP) COUNT, and includes a hyper frame number (HFN) and a PDCP sequence number (PDCP SN);
determine a radio bearer to be restored; and
perform, by using the security key and a data packet count for the radio bearer that may need to be restored, data transmission meant for the radio bearer to be restored.

2. The user equipment according to claim 1, wherein the processor is configured to:
when a downlink control information DCI format in the PDCCH is correctly decoded based on the identification information that identifies the user equipment within a range of the base station or within a range of one or more cells of the base station, determine that the second indication information is successfully obtained.

3. The user equipment according to claim 1, wherein the processor is configured to:
decode the PDCCH based on the identification information that identifies the user equipment within a range of the base station or within a range of one or more cells of the base station, to obtain the second indication information comprised in the DCI format in the PDCCH.

4. The user equipment according to claim 1, wherein the receiver module is further configured to:
receive obtaining manner indication information from the base station, wherein the obtaining manner indication information is used to indicate an obtaining manner in which the user equipment obtains the second indication information; and
the obtaining manner comprises at least two of the following manners:
a first obtaining manner: correctly decoding the downlink control information DCI format in the PDCCH based on the identification information that identifies the user equipment within the range of the base station or within the range of the one or more cells of the base station, to obtain the second indication information;
a second obtaining manner: decoding the PDCCH based on the identification information that identifies the user equipment within the range of the base station or within the range of the one or more cells of the base station, to obtain the second indication information comprised in the DCI format in the PDCCH; and
a third obtaining manner: detecting the PDCCH based on a P-RNTI, to obtain the second indication information.

5. The user equipment according to claim 1,
wherein the processor is configured to detect the PDCCH based on a P-RNTI, to obtain the second indication information, wherein the second indication information is paging message scheduling information; and
wherein the receiver is further configured to receive, from a PDSCH and based on the scheduling information, a paging message corresponding to the user equipment; and
wherein the processor is further configured to determine, based on the paging message, that the user equipment is the paged object or that there is a service of the user equipment.

6. The user equipment according to claim 1, wherein the processor is configured to:
search common search space (CSS) or user equipment specific search space (USS), and decode the DCI format in the PDCCH by using the identification information of the user equipment, to obtain the second indication information.

7. The user equipment according to claim 2, wherein the DCI format further comprises system information change indication information and/or emergency service indication information.

8. The user equipment according to claim 1, wherein the processor is further configured to:
decode the PDCCH based on the identification information of the user equipment, to obtain any piece of second indication information among second indication information sent by the base station at N different paging occasions (POs) corresponding to the user equipment, respectively.

9. The user equipment according to claim 1, wherein the processor is further configured to:
decode the PDCCH based on the identification information of the user equipment, to obtain N pieces of second indication information continuously sent by the base station at one paging occasion (POS) corresponding to the user equipment and in N−1 consecutive subframes subsequent to the PO.

10. A data transmission processing method, comprising:
receiving, by user equipment, first indication information sent by a base station, and saving context information of the user equipment according to the first indication information, wherein the context information comprises identification information of the user equipment;
decoding, by the user equipment, a physical downlink control channel (PDCCH) based on the identification information of the user equipment, to obtain second indication information;
determine that the user equipment is a paged object or that there is a service of the user equipment according to the second indication information;
save, according to the first indication information, a security key used for data transmission between the user equipment and the base station and a data packet count for at least one radio bearer, wherein the security key comprises an encryption key and/or an integrity protection key and the data packet count is compliant with the Packet Data Convergence Protocol (PDCP) COUNT, and includes a hyper frame number (HFN) and a PDCP sequence number (PDCP SN);

determine a radio bearer to be restored; and perform, by using the security key and a data packet count for the radio bearer that may need to be restored, data transmission meant for the radio bearer to be restored.

11. The method according to claim 10, wherein the decoding, by the user equipment, the PDCCH based on the identification information of the user equipment, to obtain second indication information comprises:

when the user equipment correctly decodes a downlink control information (DCI) format in the PDCCH based on the identification information that identifies the user equipment within a range of the base station or within a range of one or more cells of the base station, determining that the second indication information is successfully obtained.

12. The method according to claim 10, wherein the decoding, by the user equipment, the PDCCH based on the identification information of the user equipment, to obtain second indication information comprises:

decoding, by the user equipment, the PDCCH based on the identification information that identifies the user equipment within a range of the base station or within a range of one or more cells of the base station, to obtain the second indication information comprised in the DCI format in the PDCCH.

13. The method according to claim 10, wherein the method further comprise:

receiving, the user equipment, obtaining manner indication information from the base station, wherein the obtaining manner indication information is used to indicate an obtaining manner in which the user equipment obtains the second indication information; and the obtaining manner comprises at least two of the following manners:

a first obtaining manner: correctly decoding the downlink control information DCI format in the PDCCH based on the identification information that identifies the user equipment within the range of the base station or within the range of the one or more cells of the base station, to obtain the second indication information;

a second obtaining manner: decoding the PDCCH based on the identification information that identifies the user equipment within the range of the base station or within the range of the one or more cells of the base station, to obtain the second indication information comprised in the DCI format in the PDCCH; and a third obtaining manner: detecting the PDCCH based on a P-RNTI, to obtain the second indication information.

14. The method according to claim 10, wherein the decoding PDCCH based on the identification information of the user equipment to obtain second indication information comprises:

detecting, the user equipment, the PDCCH based on a P-RNTI, to obtain the second indication information, wherein the second indication information is paging message scheduling information; and wherein the method futher comprises: receiving, by the user equipment, from a PDSCH and based on the scheduling information, a paging message corresponding to the user equipment; and determine, based on the paging message, that the user equipment is the paged object or that there is a service of the user equipment.

15. The method according to claim 10, wherein the decoding, by the user equipment, the PDCCH based on the identification information of the user equipment, to obtain second indication information comprises:

searching, by the user equipment, common search space (CSS) or user equipment specific search space (USS), and decode the DCI format in the PDCCH by using the identification information of the user equipment, to obtain the second indication information.

16. The method according to claim 11, wherein the DCI format further comprises system information change indication information and/or emergency service indication information.

17. The method according to claim 10, wherein the method further comprises:

decoding, by the user equipment, the PDCCH based on the identification information of the user equipment, to obtain any piece of second indication information among second indication information sent by the base station at N different paging occasions (Pos) corresponding to the user equipment, respectively.

18. The method according to claim 10, wherein the method further comprises:

decoding, by the user equipment, the PDCCH based on the identification information of the user equipment, to obtain N pieces of second indication information continuously sent by the base station at one paging occasion (PO) corresponding to the user equipment and in N−1 consecutive subframes subsequent to the PO.

* * * * *

UNITED STATES PATENT AND TRADEMARK OFFICE
CERTIFICATE OF CORRECTION

PATENT NO.        : 10,412,705 B2
APPLICATION NO.   : 16/023353
DATED             : September 10, 2019
INVENTOR(S)       : Junren Chang et al.

It is certified that error appears in the above-identified patent and that said Letters Patent is hereby corrected as shown below:

In the Claims

Column 54, Line 46:
In Claim 9, after "occasion" delete "(POS)" and insert -- (PO) --, therefor.

Signed and Sealed this
Twenty-fourth Day of December, 2019

Andrei Iancu
*Director of the United States Patent and Trademark Office*